United States Patent
Bhatia et al.

(10) Patent No.: US 8,768,877 B2
(45) Date of Patent: Jul. 1, 2014

(54) SYSTEM AND METHOD FOR DATA MANIPULATION

(75) Inventors: Rishi Bhatia, Walpole, MA (US); Matthew J. Schulze, Glen Ellyn, IL (US); John M. Tomaszewski, Villa Park, IL (US); Robert B. Kittredge, Newton, MA (US); Davanum Srinivas, Sharon, MA (US)

(73) Assignee: Ca, Inc., Islandia, NY (US)

( * ) Notice: Subject to any disclaimer, the term of this patent is extended or adjusted under 35 U.S.C. 154(b) by 2339 days.

(21) Appl. No.: 11/369,738

(22) Filed: Mar. 7, 2006

(65) Prior Publication Data

US 2006/0200739 A1 Sep. 7, 2006

Related U.S. Application Data

(60) Provisional application No. 60/659,264, filed on Mar. 7, 2005.

(51) Int. Cl.
*G06F 7/00* (2006.01)
*G06F 17/00* (2006.01)

(52) U.S. Cl.
USPC .......................................................... 707/601

(58) Field of Classification Search
None
See application file for complete search history.

(56) References Cited

U.S. PATENT DOCUMENTS

| | | |
|---|---|---|
| 5,539,378 A | 7/1996 | Chang |
| 5,627,979 A | 5/1997 | Chang et al. |
| 5,734,905 A | 3/1998 | Oppenheim |
| 5,991,731 A | 11/1999 | Colon et al. |
| 6,356,920 B1 | 3/2002 | Vandersluis |
| 6,529,909 B1 | 3/2003 | Bowman-Amuah |
| 6,590,589 B1 | 7/2003 | Sluiman et al. |
| 6,598,219 B1 | 7/2003 | Lau |
| 6,601,071 B1 | 7/2003 | Bowker et al. |
| 6,782,403 B1 | 8/2004 | Kino et al. ................... 707/203 |
| 6,792,605 B1 | 9/2004 | Roberts et al. |
| 6,799,184 B2 | 9/2004 | Bhatt et al. |
| 6,823,495 B1 | 11/2004 | Vedula et al. |
| 6,996,589 B1 | 2/2006 | Jayaram et al. |
| 7,047,488 B2 | 5/2006 | Ingersoll et al. |

(Continued)

OTHER PUBLICATIONS

PCT Notification of Transmittal of the International Search Report and the Written Opinion of the International Searching Authority, or the Declaration, in International Application No. PCT/US2006/008131, dated Jun. 26, 2006, 10 pgs.

(Continued)

*Primary Examiner* — Robert Beausoliel, Jr.
*Assistant Examiner* — Nicholas Allen
(74) *Attorney, Agent, or Firm* — Baker Botts, LLP

(57) ABSTRACT

A method for transforming data includes creating an array and initializing a value in each array element of the array. The method also includes storing data in the array from data components in a source file by, for each data component in the source file, detecting a beginning of the data component and determining whether an array element corresponding to the detected data component is included in the array. If an array element corresponding to a particular data component is included in the array, a value of the corresponding array element is set based on data in the detected data component. If an array element corresponding to that data component is not included in the array, the detected data component is discarded. Additionally, the method includes writing at least a portion of the data stored in the array to a target file.

16 Claims, 14 Drawing Sheets

(56) References Cited

U.S. PATENT DOCUMENTS

| | | | |
|---|---|---|---|
| 7,058,645 B2 | 6/2006 | Seto et al. | |
| 7,159,185 B1 | 1/2007 | Vedula et al. | |
| 7,607,120 B2 | 10/2009 | Sanyal et al. | |
| 7,661,103 B2 | 2/2010 | Hayward | |
| 7,698,634 B2 | 4/2010 | Bhatia et al. | |
| 7,703,008 B2 | 4/2010 | Ingersoll et al. | |
| 7,761,406 B2 | 7/2010 | Harken | |
| 7,840,895 B2 | 11/2010 | Bhatia et al. | |
| 2001/0039540 A1 | 11/2001 | Hofmann et al. | |
| 2002/0026461 A1 | 2/2002 | Kutay et al. | |
| 2002/0129059 A1 | 9/2002 | Eck | |
| 2002/0174010 A1 | 11/2002 | Rice, III | |
| 2002/0174098 A1 | 11/2002 | Wu et al. | |
| 2002/0184213 A1 | 12/2002 | Lau et al. | |
| 2003/0018661 A1 | 1/2003 | Darugar | |
| 2003/0046288 A1 | 3/2003 | Severino et al. | |
| 2003/0070144 A1 | 4/2003 | Schnelle et al. | 715/513 |
| 2003/0120593 A1 | 6/2003 | Bansal et al. | |
| 2003/0140007 A1 | 7/2003 | Kramer et al. | |
| 2003/0167254 A1 | 9/2003 | Su et al. | |
| 2003/0167445 A1 | 9/2003 | Su et al. | |
| 2003/0193521 A1 | 10/2003 | Chen et al. | |
| 2004/0015523 A1* | 1/2004 | Guest et al. | 707/204 |
| 2004/0060003 A1 | 3/2004 | Mani et al. | |
| 2004/0060004 A1 | 3/2004 | Mani et al. | |
| 2004/0148270 A1 | 7/2004 | McKay et al. | |
| 2004/0193759 A1 | 9/2004 | Scott et al. | |
| 2004/0205452 A1 | 10/2004 | Fitzsimons et al. | |
| 2004/0205562 A1 | 10/2004 | Rozek et al. | |
| 2004/0254881 A1 | 12/2004 | Kumar et al. | |
| 2005/0027743 A1 | 2/2005 | O'Neil et al. | 707/104.1 |
| 2005/0060647 A1* | 3/2005 | Doan et al. | 715/514 |
| 2005/0097128 A1* | 5/2005 | Ryan et al. | 707/103 Y |
| 2005/0097147 A1* | 5/2005 | Hunt et al. | 707/200 |
| 2005/0132282 A1 | 6/2005 | Panditharadhya et al. | |
| 2005/0149536 A1 | 7/2005 | Wildes et al. | |
| 2005/0149552 A1 | 7/2005 | Chan et al. | |
| 2005/0182772 A1 | 8/2005 | Mital et al. | |
| 2005/0182773 A1 | 8/2005 | Feinsmith | |
| 2005/0251812 A1 | 11/2005 | Hayward | |
| 2005/0257193 A1 | 11/2005 | Falk et al. | |
| 2006/0085465 A1 | 4/2006 | Nori et al. | |
| 2006/0089995 A1 | 4/2006 | Kerr et al. | |
| 2006/0156314 A1 | 7/2006 | Waldorf | |
| 2006/0200747 A1 | 9/2006 | Bhatia et al. | |
| 2006/0200753 A1 | 9/2006 | Bhatia et al. | |
| 2007/0220022 A1 | 9/2007 | Lankinen et al. | |
| 2008/0010629 A1 | 1/2008 | Berg et al. | |

OTHER PUBLICATIONS

PCT Notification of Transmittal of the International Search Report and the Written Opinion of the International Searching Authority, or the declaration with attached Search Report and Written Opinion in International Application No. PCT/US2006/008014, dated Jul. 19, 2006, 10 pages.

PCT International Notification of Transmittal of the International Search Report and the Written Opinion of the International Searching Authority, or the Declaration with attached PCT International Search Report and Written Opinion of the International Searching Authority in International Application No. PCT/US2006/008015, dated Aug. 11, 2006, 9 pages.

Shengru Tu et al. "Design Strategies to Improve Performance of GIS Web Services," Proceedings of the International Conference on Information Technology: Coding and Computing (ITCC '04), *IEEE* 2004, 5 pages.

Notification of Transmittal of the International Search Report and the Written Opinion of the International Searching Authority, or the Declaration mailed Aug. 18, 2006 in reference to PCT/US2006/008013 filed Mar. 7, 2006, 10 pp.

Notification of Transmittal of the International Search Report and the Written Opinion of the International Searching Authority, or the Declaration mailed Aug. 3, 2006 in reference to PCT/US2006/007991 filed Mar. 7, 2006, 11 pp.

Agosta, "Criteria for Selection; ETL Technology, Part 2," Giga Information Group.

CA, Advantage Data Transformer Enterprise Metadata Edition 2.1/Advantage Data Transformer 2.1 Service Pack 1, A01182-1E 2004.

Scott, "Extraction, Transformation, and Load Issues and Approaches," TDAN.com 2000.

Yongquiang Li et al. "A Data Mapping Specification Environment Using a Concrete Business Form—Based Metaphor," IEEE 2002, pp. 158-166. 2002.

Yannis Papakonstantinou, et al.; QURSED: Querying and Reporting Semistructured Data; ACM SIGMOD 2002; pp. 192-203, Jun. 4-6, 2002.

Tova Milo, et al.; Using Schema Matching to Simplify Heterogeneous Data Translation; Proceedings of the 24th Vldb Conference; pps. 122-133, 1998. 1998.

Michael Himsolt; Graphlet: Design and Implementation of a Graph Editor; Sp pps. 1303-1324, 2000. 2000.

John Grundy, et al.; Generating Edi Message Translations From Visual Specifications; 0/7695- 1426-X; pps. 35-42, 2001. 2001.

Guanglei Song, et al.; Model Management Through Graph Transformation; Proceedings of the 2004 IEEE Symposium on Visual Languages and Iluman Centric Computing (Vlhcc'04); pps. 75-82, 2004. 2004.

Sebastian Bossung, et al.; Automated Data Mapping Specification Via Schema Heuristics and User Interaction; Proceedings of the 19th Intl. Conference on Automated Software Engineering (Ase'04); pps. 208-217, 2004. 2004.

J.C. Grundy, et al.; Domain-Specific Visual Languages for Specifying and Generating Data Mapping Systems; Journal of Visual Languages & Computing; pps. 243-263, 2004. 2004.

Octavian Patrascoiu; Mapping Edoc to Web Services Using Yatl; Proceedings of the 8th IEEE Int'l Enterprise Distributed Object Computing Conf (Edoc 2004); pps. 286-297, 2004. 2004.

Bhatia et al., Ussn 11/135,000, Uspto Non-final Office Action, Atty. Docket 063170.2691 Sep. 2007.

Bhatia et al., Ussn 11/135,000, Response to US PTO Non-final Office Action, Atty. Docket 063170.2691 Dec. 2007.

Bhatia et al., Ussn 11/135,000, Uspto Final Office Action, Atty. Docket 063170.2691 (3 pgs) Mar. 2008.

Bhatia et al., Ussn 11/135,000, Request for Continued Examination, Atty. Docket 063170.2691 May 2008.

Bhatia et al., Ussn 11/135,000, Uspto Advisory Action, Atty. Docket 063170.2691 Jun. 2008.

Bhatia et al., Ussn 11/135,000, Request for Continued Examination, Atty. Docket 063170.2691 Jun. 2008.

Bhatia et al., Ussn 11/135,000, Uspto Non-final Office Action, Atty. Docket 063170.2691 Sep. 2008.

Bhatia et al., Ussn 11/135,000, Response to US PTO Non-final Office Action, Attorney's Docket 063170.2691 Dec. 2008.

Bhatia et al., Ussn 11/135,000, Uspto Non-final Office Action, Atty. Docket 063170.2691 Apr. 2009.

Bhatia et al., Ussn 11/135,000, Response to US PTO Non-final Office Action, Atty. Docket 063170.2691 Jul. 2009.

Bhatia et al., Iissn 11/135,000, Uspto Final Office Action, Atty. Docket 063170.2691 Nov. 2009.

Bhatia et al., Ussn 11/135,000, Response to US PTO Final Office Action, Atty. Docket 063170.2691 Jan. 2010.

Bhatia et al., Ussn 11/135,000, Uspto Advisory Action, Atty. Docket 063170.2691 Jan. 2010.

Bhatia et al., Ussn 11/135,000, Notice of Appeal with Pre-Brief Conference Request, Attorney's Docket 063170.2691 Feb. 2010.

Bhatia et al., Ussn 11/135,000, Uspto Pre-Brief Appeal Decision, Attorney's Docket 063170.2691 Apr. 2010.

Bhatia et al., Ussn 11/135,000, Uspto Notice of Allowance, Atty. Docket 063170.2691 Aug. 2010.

Bhatia et al., Ussn 11/135,000, Amendment after Notice of Allowance, Attorney's Docket 063170.2691 Sep. 2010.

Bhatia et al., Ussn 11/135,000, Uspto Response to Amendment, Attorney's Docket 063170.2691 Oct. 2010.

Bhatia et al., Ussn 11/135,000, Issue Fee, Attorney's Docket 063170.2691 Oct. 2010.

Bhatia et al., Ussn 11/135,000, Issue Notification, Attorney's Docket 063170.2691 Nov. 2010.

(56) References Cited

OTHER PUBLICATIONS

Bhatia et al., Ussn 11/369,792 filed Mar. 07, 2006, Uspto non-final Office Action, Atty. Docket 063170.2692 Feb. 2008.
Bhatia et al., Ussn 11/369,792, Response to Uspto Non-final Office Action, Attorney's Docket 063170.2692 May 2008.
Bhatia et al., Ussn 11/369,792 filed Mar. 07, 2006, Uspto Final Office Action, Atty. Docket 063170.2692 Aug. 2008.
Bhatia et al., Ussn 11/369,792, Request for Continued Examination, Atty. Docket 063170.2692 Nov. 2008.
Bhatia et al., Ussn 11/369,792 filed Mar. 07, 2006, Uspto Non-final Office Action, Atty. Docket 063170.2692 Dec. 2008.
Bhatia et al., Ussn 11/369,792, Response to Uspto Non-final Action, Attorney's Docket 063170.2692 Mar. 2009.
Uspto Office Action; Bhatia et al, Ussn 11/369,792 filed Mar. 07, 2006, Atty Docket no. 063170.2692 Jul. 2009.
Bhatia et al., Ussn 11/369,792, Notice of Appeal and Pre-Brief Conference Request, Attorney's Docket 063170.2692 Oct. 2009.
Uspto Office Action; Bhatia et al, Ussn 11/369,792 filed Mar. 07, 2006, Attorney's Docket 063170.2692 Feb. 2010.
Bhatia et al., Ussn 11/369,792, Response to Uspto Non-final Office Action, Attorney's Docket 063170.2692 May 2010.
Uspto Office Action; Bhatia et al, Ussn 11/369,792 filed Mar. 07, 2006, Attorney's Docket 063170.2692 Aug. 2010.
Bhatia et al., Ussn 11/369,792, Response to Uspto Final Office Action, Attorney's Docket 063170.2692 Sep. 2010.
Bhatia et al., Ussn 11/369,792, Uspto Advisory Action , Attorney's Docket 063170.2692 Oct. 2010.
Bhatia et al., Ussn 11/369,792, Notice of Appeal and Pre-Brief Conference Request, Attorney's Docket 063170.2692 Nov. 2010.
Bhatia et al., Ussn 11/369,792, Appeal Brief, Attorney's Docket 063170.2692 Dec. 2010.
Bhatia et al., Ussn 11/369,792, Uspto Examiner's Answer to Appeal Brief, Attorney's Docket 063170.2692 Mar. 2011.
Bhatia et al., Ussn 11/369,792, Reply Brief, Attorney's Docket 063170.2692 May 2011.
Bhatia et al., Ussn 11/369,792, Appeal Docket Notice, Attorney's Docket 063170.2692 Jun. 2011.
Bhatia et al., Uspto Non-final Office Action in Ussn No. 11/3 69,3 97, Atty. docket No. 063 170.2693 Oct. 2009.
Bhatia et al., Ussn 11/369,397, Response Uspto Non-final Office Action, Attorney's Docket 063170.2693 Jan. 2010.
Bhatia et al., Uspto Final Office Action in Ussn No. 11/3 69,3 97, Atty. docket No. 063 170.2693 May 2010.
Bhatia et al., Ussn 11/369,397, Request for Continued Examination, Attorney's Docket 063170.2693 Jul. 2010.
Bhatia et al., Ussn 11/369,397, Response Uspto Advisory Action, Atty. Docket 063170.2693 Jul. 2010.
Bhatia ct al., Ussn 11/369,397, Request for Continued Examination, Attorney's Docket 063170.2693 Sep. 2010.
Bhatia et al., Ussn 11/369,397, Uspto Non-final Office Action, Attorney's Docket 063170.2693 Oct. 2011.
Bhatia et al., Ussn 11/369,397, Response Uspto Non-final Office Action, Attorney's Docket 063170.2693 Jan. 2012.
Bhatia et al., Ussn 11/369,397, Uspto Final Office Action, Attorney's Docket 063170.2693 Apr. 2012.
Bhatia et al., Ussn 11/369,397, Request for Continued Examination, Attorney's Docket 063170.2693 Jul. 2012.
Bhatia et al., Ussn 11/369,397, Uspto Non-final Office Action, Attorney's Docket 063170.2693 06/20/13.
Bhatia et al., Ussn 11/369,397, Response Uspto non-final Office Action, Attorney's Docket 063170.2693 09/20/13.
Rhatia et al., Ussn 11/369,397, Final Office Action, Attorney's Docket 063170.2693 Jan. 2014.
Bhatia et al., Ussn 11/134,993, Uspto Non-final Office Action, Attorney's Docket 063170.3986 Jul. 2007.
Bhatia et al., Ussn 11/134,993, Response to Non-final Office Action, Attorney's Docket 063170.3986 Oct. 2007.
Bhatia et al., Ussn 11/134,993, Uspto Final Office Action, Attorney's Docket 063170.3986 Dec. 2007.
Bhatia et al., Ussn 11/134,993, Request for Continued Examination, Attorney's Docket 063170.3986 Mar. 2008.
Bhatia et al., Ussn 11/134,993, Uspto Non-final Office Action, Attorney's Docket 063170.3986 Mar. 2008.
Bhatia et al., Ussn 11/134,993, Response to Uspto Non-final Office Action, Attorney's Docket 063170.3986 Jun. 2008.
Bhatia et al., Ussn 11/134,993, Uspto Final Office Action, Attorney's Docket 063170.3986 Oct. 2008.
Bhatia ct al., Ussn 11/134,993, Request for Continued Examination, Attorney's Docket 063170.3986 Jan. 2009.
Bhatia et al., Ussn 11/134,993, Uspto Non-final Office Action, Attorney's Docket 063170.3986 Feb. 2009.
Bhatia et al., Ussn 11/134,993, Response to US PTO Non-final Office Action, Attorney's Docket 063170.3986 May 2009.
Bhatia et al., Ussn 11/134,993, Uspto Final Office Action, Attorney's Docket 063170.3986 Aug. 2009.
Bhatia et al., Ussn 11/134,993, Request for Continued Examination, Attorney's Docket 063170.3986 Nov. 2009.
Bhatia et al., Ussn 11/134,993, Uspto Notice of Allowance, Attorney's Docket 063170.3986 Nov. 2009.
Bhatia et al., Ussn 11/135,000, Response Pursuant to 37 C.F.R. § 1.116 (Atty's Docket 063170.2691). May 2008.
Bhatia et al., Ussn 11/369,792, Notice of Appeal and Pre-Brief Conference Request (a ty's Docket 063170.2692). Nov. 2010.
Bhatia et al., Ussn 11/369,397, Response Pursuant to 37 C.F.R. § 1.116 (Atty's Docket 063170.2693). Jul. 2010.
Bhatia et al., Ussn 11/369,397, Advisory Action (Atty's Docket 063170.2693). Jul. 2010.

\* cited by examiner

REM * Structure definitions

```
DEF Person AS PersonDef
DEF Car AS CarDef
DIM PersonCars_Document(10) AS xmlComponentDef
ARRAYCLEAR(PersonCars_Document)
   PersonCars_Document(0).comp_name = "PersonCars_Document"
   PersonCars_Document(0).comp_type = 1
   PersonCars_Document(0).comp_id = 0
   PersonCars_Document(0).comp_parent = 0
   PersonCars_Document(0).comp_level = 0
   PersonCars_Document(1).comp_name = "Person_Record"
   PersonCars_Document(1).comp_type = 1
   PersonCars_Document(1).comp_id = 1
   PersonCars_Document(1).comp_parent = 0
   PersonCars_Document(1).comp_level = 1
   PersonCars_Document(2).comp_name = "Id"
   PersonCars_Document(2).comp_type = 1
   PersonCars_Document(2).comp_id = 2
   PersonCars_Document(2).comp_parent = 1
   PersonCars_Document(2).comp_level = 2
   PersonCars_Document(3).comp_name = "Name"
   PersonCars_Document(3).comp_type = 1
   PersonCars_Document(3).comp_id = 3
   PersonCars_Document(3).comp_parent = 1
   PersonCars_Document(3).comp_level=2
   PersonCars_Document(4).comp_name="Car"
   PersonCars_Document(4).comp_type=1
   PersonCars_Document(4).comp_id=4
   PersonCars_Document(4).comp_parent=1
   PersonCars_Document(4).comp_IsRepeating=TRUE
   PersonCars_Document(4).comp_level=2
   PersonCars_Document(5).comp_name="Make"
   PersonCars_Document(5).comp_type=1
   PersonCars_Document(5).comp_id=5
   PersonCars_Document(5).comp_parent=4
   PersonCars_Document(5).comp_level=3
   PersonCars_Document(6).comp_name="Model"
   PersonCars_Document(6).comp_type=1
   PersonCars_Document(6).comp_id=6
   PersonCars_Document(6).comp_parent=4
   PersonCars_Document(6).comp_level=3
   PersonCars_Document(7).comp_name="Year"
   PersonCars_Document(7).comp_type=1
   PersonCars_Document(7).comp_id=7
   PersonCars_Document(7).comp_parent=4
   PersonCars_Document(7).comp_level=3
   PersonCars_Document(8).comp_name="Address"
   PersonCars_Document(8).comp_type=1
   PersonCars_Document(8).comp_id=8
   PersonCars_Document(8).comp_parent=1
   PersonCars_Document(8).comp_level=2
```

FROM FIG. 5A

```
REM * End of structure definitions
*
*
*
REM *
REM * Connect to data sources and targets
REM *
CONNECT PersonProfile ()
CONNECT CarProfile ()                              } 509
CONNECT PersonCars_DocumentProfile ()
Person_Done = FALSE REM * Request/query the result set to transfer PersonQuery = "SELECT P.id, P.name, P.address FROM JohnsTestDatabase.dbo.Person" +
"P"
SEND PersonProfile (#sql PersonQuery) ⟵510

DO WHILE FALSE = Person_Done
    returnValue = LOAD PersonProfile (#data Person) ⟵512
    IF _IPRET_SUCCESS <> returnValue THEN
      Person_Done = TRUE
      IF _IPRET_NO_DATA_AVAIL = returnValue THEN
        IF 0 = PersonCount THEN
          MESSAGE("No rows read")
        ELSE
            MESSAGE(PersonCount, "total rows read from Person")
        END IF
        STRUCTCLEAR(Person)
        REM * DO NOT PROCESS THE LAST (NULL) RECORD
        CONTINUE
      ELSE
        MESSAGE("LOAD returned", returnValue, "at line", ERL())
        CONTINUE
      END IF
    ELSE
      PersonCount = PersonCount + 1
    END IF Car_Done = FALSE REM * Request/query the result set to transfer CarQuery = "SELECT C.make, C.model, C.year FROM JohnsTestDatabase.dbo.Car" +
"C WHERE" + TOSTRING(Person.id) + "= C.id"
      SEND CarProfile (#sql CarQuery) ⟵510
      DO WHILE FALSE = Car_Done
        returnValue = LOAD CarProfile (#data Car) ⟵512
        IF _IPRET_SUCCESS <> returnValue THEN
          Car_Done = TRUE
          IF _IPRET_NO_DATA_AVAIL = returnValue THEN
```

FROM FIG. 5B

```
        IF 0 = CarCount THEN
            MESSAGE("No rows read")
          ELSE
            MESSAGE(CarCount, "total rows read from Car")
        END IF
        STRUCTCLEAR(Car)
        REM * DO NOT PROCESS THE LAST (NULL) RECORD
        CONTINUE
      ELSE
        MESSAGE("LOAD returned", returnValue, "at line", ERL())
        CONTINUE
      END IF
    ELSE
        CarCount = CarCount + 1
    END IF PersonCars_Document(5).comp_value = Car.make
    PersonCars_Document(6).comp_value = Car.model
    CONVERT(Car.year, PersonCars_Document(7).comp_value)

returnValue = STORE PersonCars_DocumentProfile (#data PersonCars_Document,
                                                    #create TRUE,
                                                    #map_type TRUE,
                                                    #mode PersonCars_DocumentStoreMode, #file
    "C:\\My Documents\\XML\\PersonCars_Document.xml", #repeating_element_index 4)
    IF _IPRET_SUCCESS <> returnValue THEN
      MESSAGE("STORE returned", returnValue, "at line", ERL())
    ELSE
      PersonCars_DocumentCount = PersonCars_DocumentCount + 1
    END IF
  LOOP CONVERT(Person.id, PersonCars_Document(2).comp_value)
  PersonCars_Document(3).comp_value = Person.name
  PersonCars_Document(8).comp_value = Person.address returnValue = STORE PersonCars_DocumentProfile (#data PersonCars_Document,
                                                  #create TRUE,
                                                  #map_type TRUE,
                                                  #mode PersonCars_DocumentStoreMode, #file
  "C:\\My Documents\\XML\\PersonCars_Document.xml")
  IF _IPRET_SUCCESS <> returnValue THEN
    MESSAGE("STORE returned", returnValue, "at line", ERL())
  ELSE
    PersonCars_DocumentCount = PersonCars_DocumentCount + 1
  END IF
LOOP REM * Disconnect
DISCONNECT PersonProfile ()
DISCONNECT CarProfile ()
DISCONNECT PersonCars_DocumentProfile ()
```

```
<PersonCars_Document>                                    798
    <Person_Record>
        <id> 1 <id/>
        <Name> Jack Smith <Name/>
        <Car>
            <Make> Ford <Make/>
            <Model> Explorer <Model/>
            <Year> 1998 <Year/>
        <Car>
            <Make> Dodge <Make/>
            <Model> Ram <Model/>
            <Year> 2000 <Year/>
        <Address> 125 Elm St, Smithsville, TX, 82671 <Address/>
    <Person_Record/>
    <Person_Record>
        <id> 2 <id/>
        <Name> Sue Jones <Name/>
        <Car>
            <Make> Buick <Make/>
            <Model> Le Saber <Model/>
            <Year> 1999 <Year/>
        <Car>
            <Make> Chevrolet <Make/>
            <Model> Impala <Model/>
            <Year> 2002 <Year/>
        <Address> 5 Main St, Crosstown, IA, 82671 <Address/>
    <Person_Record/>
<PersonCars_Document/>
```

FROM FIG. 12A  FIG. 12B

```
DO WHILE LOAD StockCompanies
1310e   in_GetQuoteWS(2).comp_value = StockCompanies.StockSymbol 1310f   webServiceReturn = CallWebService1(GetQuoteWS, in_GetQuoteWS, out_GetQuoteWS)

IF webServiceReturn < > 0 THEN
            MESSAGE("Web Service GetQuoteWS returned ", webServiceReturn, " at line", ERL())
1310g       MESSAGE(GetQuoteWS.errorMessage)
            CONTINUE
        END IF 1310h   CONVERT(out_GetQuoteWS(2).comp_value, StockQuotes.StockPrice)
        STORE StockQuotes
```

FIG. 12A

1310a — !INCLUDE "WebService_Declarations"

1310b
```
DIM in_GetQuoteWS(3) AS xmlComponentDef
ARRAYCLEAR(in_GetQuoteWS)
 in_GetQuoteWS(0).comp_name = "getQuote"
 in_GetQuoteWS(0).comp_type = 1
 in_GetQuoteWS(0).comp_id = 0
 in_GetQuoteWS(0).comp_parent = 0
 in_GetQuoteWS(0).comp_namespaceURI = "urn:xmethods-delayed-quotes"
 in_GetQuoteWS(1).comp_name = "xmlns"
 in_GetQuoteWS(1).comp_type = 2
 in_GetQuoteWS(1).comp_id = 1
 in_GetQuoteWS(1).comp_parent = 0
 in_GetQuoteWS(1).comp_namespaceURI = "urn:xmethods-delayed-quotes"
 in_GetQuoteWS(1).comp_datatype = 14
 in_GetQuoteWS(2).comp_name = "symbol"
 in_GetQuoteWS(2).comp_type = 1
 in_GetQuoteWS(2).comp_id = 2
 in_GetQuoteWS(2).comp_parent = 0
 in_GetQuoteWS(2).comp_namespaceURI = "urn:xmethods-delayed-quotes"
 in_GetQuoteWS(2).comp_datatype = 14
```

1310c
```
Def GetQuoteWS AS webServiceDef1
 GetQuoteWS.location = "http://66.28.98.121:9090/soap"
 GetQuoteWS.SOAPAction = "urn:xmethods-delayed-quotes#getQuote"
 GetQuoteWS.proxyHost = "caproxy.ca.com"
 GetQuoteWS.proxyPort = "80"
 GetQuoteWS.proxyProfile = "WSTProfile"
```

1310d
```
DIM out_GetQuoteWS(3) AS xmlComponentDef
ARRAYCLEAR(out_GetQuoteWS)
 out_GetQuoteWS(0).comp_name = "getQuoteResponse"
 out_GetQuoteWS(0).comp_type = 1
 out_GetQuoteWS(0).comp_id = 0
 out_GetQuoteWS(0).comp_parent = 0
 out_GetQuoteWS(0).comp_namespaceURI = "urn:xmethods-delayed-quotes"
 out_GetQuoteWS(0).comp_NS_Prefix = "n"
 out_GetQuoteWS(1).comp_name = "n"
 out_GetQuoteWS(1).comp_type = 2
 out_GetQuoteWS(1).comp_id = 1
 out_GetQuoteWS(1).comp_parent = 0
 out_GetQuoteWS(1).comp_namespaceURI = "urn:xmethods-delayed-quotes"
 out_GetQuoteWS(1).comp_NS_Prefix = "n"
 out_GetQuoteWS(1).comp_datatype = 14
 out_GetQuoteWS(2).comp_name = "Result"
 out_GetQuoteWS(2).comp_type = 1
 out_GetQuoteWS(2).comp_id = 2
 out_GetQuoteWS(2).comp_parent = 0
 out_GetQuoteWS(2).comp_datatype = 14
```

TO FIG. 12B

SYSTEM AND METHOD FOR DATA MANIPULATION

RELATED APPLICATIONS

This application claims the priority under 35 U.S.C. §119 of provisional application Ser. No. 60/659,264 filed Mar. 7, 2005, which is incorporated by reference.

TECHNICAL FIELD OF THE INVENTION

This disclosure relates generally to the field of data processing and, more particularly, to a system and method for manipulating data.

BACKGROUND OF THE INVENTION

In the rapidly-evolving competitive marketplace, data is among an organization's most valuable assets. Business success demands access to data and information, and the ability to quickly and seamlessly distribute data throughout the enterprise to support business process requirements. Organizations must extract, refine, manipulate, transform, integrate and distribute data in formats suitable for strategic decision-making. This poses a unique challenge in heterogeneous environments, where data is housed on disparate platforms in any number of different formats and used in many different contexts.

SUMMARY OF THE INVENTION

In accordance with the present invention, the disadvantages and problems associated with data processing have been substantially reduced or eliminated. In particular, methods and systems for transforming data are disclosed that provide a flexible, robust manner for transforming data including extensible Markup Language ("XML") data.

In accordance with one embodiment of the present invention, a method for moving data from a source file to a target file includes creating an array based on a data definition of a target file and initializing a value in each array element of the array. The method also includes storing data in the array from at least a portion of the data components in a source file by, for each data component in the source file detecting a beginning of the data component and, in response to detecting the beginning of the data component, determining whether an array element corresponding to the detected data component is included in the array. In response to determining that an array element corresponding to a particular data component is included in the array, the method also includes storing data in the corresponding array element based on data in the detected data component. In response to determining that the array element corresponding to that particular data component is not included in the array, the method includes discarding the detected data component. Additionally, the method includes writing at least a portion of the data stored in the array to a target file.

In accordance with another embodiment of the present invention, a method for generating a target document includes receiving one or more source files that include data and generating an array comprising a plurality of array elements. Each of the array elements stores at least a portion of the data included in one or more of the source files. For each array element in the array, the method also includes writing at least a portion of the data from that particular array element to a target file by determining a level of hierarchy associated with the array element, generating a data component based on the data in the array element, and writing the data component to the output file in a manner that reflects the level of hierarchy of the array element.

Some embodiments of the present invention provide numerous technical advantages. Other embodiments may realize some, none, or all of these advantages. For example, particular embodiments may provide a data extraction, transformation, and load tool that features a flexible, easy-to-use, and comprehensive application-development environment. Particular embodiments may also reduce and/or eliminate the programming complexities of extracting, transforming, and loading data from disparate sources and targets and eliminate a need for users to learn XML programming or database-specific API's. Embodiments of the invention may facilitate seamless extraction and integration of data from and to AS/400, DB2, DB2 MVS, DBASE, flat files, COBOL files, Lotus Notes, Microsoft ODBC, Microsoft SQL Server, Oracle, Sybase, Microsoft Access, CA Ingres and UDB.

In particular embodiments, some features provide the ability to process and output a wide variety of different types of input files and output files with significant flexibility in how the data may be transformed. As one example, particular embodiments of the described system may be capable of accepting input files in an XML format, transforming the data, and outputting the transformed data in one or more database tables or flat files. Similarly, particular embodiments may be capable of accepting input database tables or flat files, transforming the data contained in these files, and outputting the transformed data in one more XML files. As another example, particular embodiments of the described system may be capable of reading and transforming documents having a variable number of instances of a particular data object. As a result, the described system and methods provide a powerful, robust data transformation solution Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

FIGS. 5A-5C illustrate an example script generated by a particular embodiment of the data manipulation system;

FIG. 7B is an example output of the example method of FIG. 7A according to one embodiment of the invention;

FIGS. 12A and 12B show an example script that may be generated by particular embodiments of the system illustrated in FIG. 10.

DETAILED DESCRIPTION OF EXAMPLE EMBODIMENTS

Figure 1:
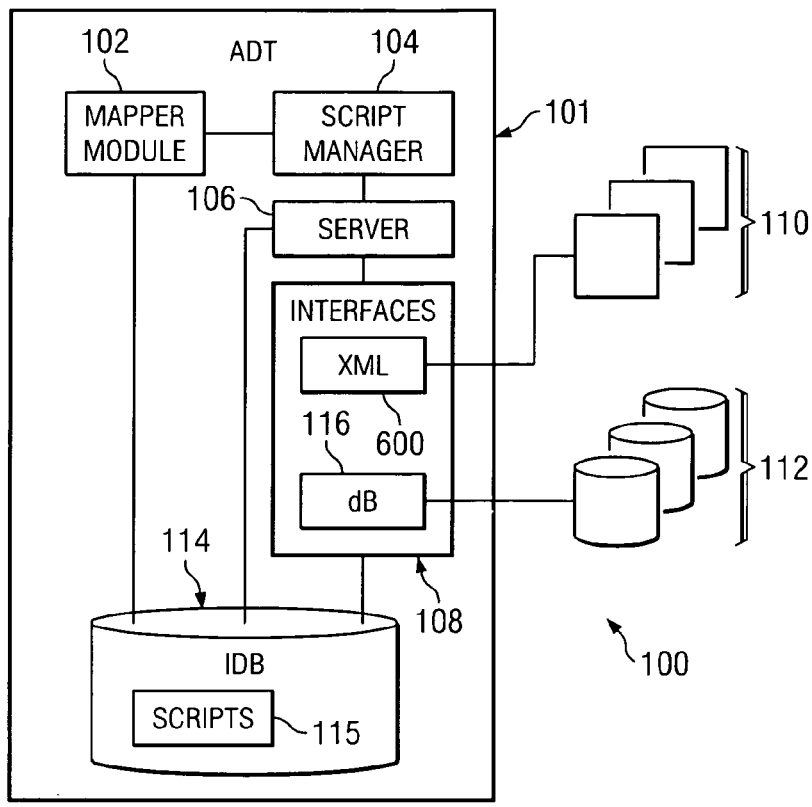
FIG. 1 is a block diagram illustrating a system for data manipulation according to one embodiment of the invention.

FIG. 1 is a block diagram illustrating a system 100 for data manipulation according to one embodiment of the present invention. Generally, system 100 includes a graphical data movement tool that is referred to herein as Advantage Data Transformer ("ADT") 101. Some embodiments of the invention facilitate extensible Markup Language ("XML") functionality with an ability to use XML document files as either sources or targets and transform data between XML format and database format, flat file format, or any other appropriate formats. Various embodiments of system 100 and ADT 101 are described below in conjunction with FIGS. 1 through 8.

In the illustrated embodiment, ADT 101 includes a mapper module 102, a script manager 104, a server 106, interfaces 108, XML files 110, database tables or files 112, and an internal database 114. The present invention contemplates more, fewer, or different components associated with ADT 101 than those illustrated in FIG. 1. In addition, any of the elements or various functions of the elements of ADT 101 may be suitably distributed among one or more computers, servers, computer systems, and networks in any suitable location or locations. As such, any suitable number of processors may be associated with, and perform the functions of, ADT 101.

Mapper module 102 includes any suitable hardware, software, firmware, or combination thereof operable to receive a first data definition (or file format ) of a source file, receive a second data definition(or file format) of a target file, and automatically generate a script 115 to represent a movement of data from the source file to the target file. For the purposes of this description and the claims that follow, the term "file" may be used to refer to a collection of data structured in any suitable manner. As a result, a "file" may contain data stored in a hierarchical structure, in a relational form, or any other appropriate manner, and a "file" may represent all or a portion of an XML file, a relational database, a flat file, or any other appropriate collection of data. Furthermore, as used herein, the term "automatically" generally means that the appropriate processing is substantially performed by mapper module 102. However, in particular embodiments, use of the term "automatically" may contemplate appropriate user interaction with mapper module 102. As described in greater detail below, mapper module 102 includes one or more suitable graphical user interfaces ("GUIs") and, among other functions, allows a user to design data formats, scan data formats from existing definitions, edit existing data formats, and design data transformation programs via drag-and-drop functionality. Further details of mapper module 102 are described below in conjunction with FIG. 2.

Script manager 104 includes any suitable hardware, software, firmware, or combination thereof operable to manage scripts 115 generated by mapper module 102. This may include storing scripts 115 in internal database 114 or other suitable storage locations, and may include scheduling scripts 115 for execution by server 106. Script manager 104 may also provide database connection information to source tables and target tables through suitable database profiles. In particular embodiments, database profiles may specify a particular interface, server name, database name, user ID, and password for a particular program.

Server 106 includes any suitable hardware, software, firmware, or combination thereof operable to execute scripts 115 when directed by script manager 104. The transformation of data formats takes place in scripts 115 when executed by server 106. In other words, server 106 may perform the data movements from one or more source files to one or more target files. As used herein, Other functionalities performed by server 106 are contemplated by the present invention.

In one embodiment, the flow between script manager 104 and server 106 is as follows: script manager 104 puts a script run request in a queue in internal database 114 when a user selects a script to run. A scheduler function within server 106 picks up the run request and verifies the script is valid to run. Server 106 then starts an interpreter function to run the relevant script. The interpreter pulls the compiled script from internal database 114 and starts interpreting (i.e., running) the script. The interpreter loads interfaces 108 during script execution. The interfaces 108 access files based on the script. Messages from the script get logged in internal database 114. The scheduler logs script return code in internal database 114, and script manager 104 inspects internal database 114 logs for script messages and return codes. Script manager 104 can view the execution and message logs from internal database 114 to report on status and completion of script execution.

Interfaces 108, in the illustrated embodiment, include an XML interface 600 and a database interface 116. However, the present invention contemplates other suitable interfaces. Interfaces 108 include any suitable hardware, software, firmware, or combination thereof operable to load and store a particular format of data when called by server 106 in accordance with scripts 115. Interfaces 108 may couple to source files and target files during execution of scripts 115. For example, in the embodiment illustrated in FIG. 1, XML interface 600 is coupled to XML files 110 and database interface 116 is coupled to database tables 112. XML files 110 and database tables 112 are representative of various data stored in various file formats and may be associated with any suitable platform including, but not limited to, Windows NT, Windows 2000, Windows 2003, Windows XP, Linux, AIX, HP-UX, and Sun Solaris. The present invention contemplates interfaces 108 having other suitable functionalities. Further details of XML interface 600 are described below in conjunction with FIG. 6.

Figure 2:
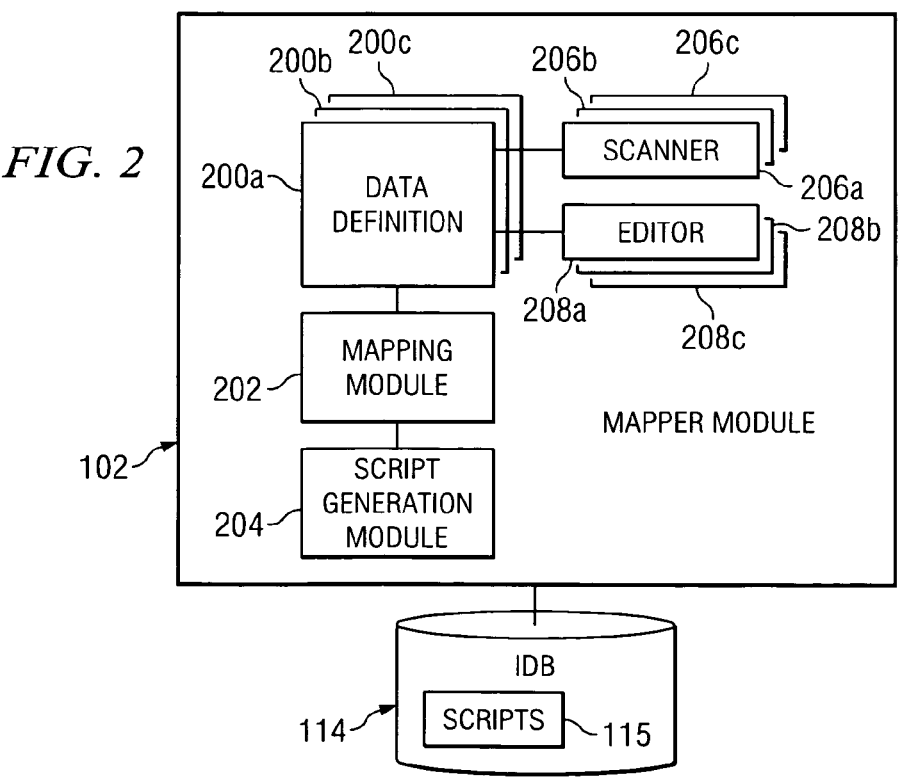
FIG. 2 is a block diagram illustrating a mapper for data manipulation according to one embodiment of the invention.

FIG. 2 is a block diagram illustrating mapper module 102 according to one embodiment of the invention. In the illustrated embodiment, mapper module 102 includes one or more editors 208 and Script Generation module 204. Mapper module 102 also includes one or more data definitions 200, a Mapping module 202, and one or more scanners 206 each associated with one or more data formats that mapper module 102 is capable of receiving and/or outputting. For example, in the illustrated example mapper module 102 includes or stores an XML Object Definition 200a, and an XML Scanner 206a for supporting functionality associated with the transformation of XML data. Similarly, the illustrated example also includes additional data definitions 200 (e.g. relational table definition 200b and flat file record definition 200c), and scanners 206 associated with DBMS files and flat files respectively. Although FIG. 2 illustrates a particular embodiment of mapper module 102 that includes particular components capable of supporting a number of specific data formats, alternative embodiments may include mapper modules 102 capable of supporting any appropriate number and types of data formats.

Data Definitions 200, in particular embodiments, are each operable to receive a data definition (or file format) of a source file and/or a target file. This may be accomplished in any suitable manner and particular embodiments may allow a user to define or design such data format. Two ways to define a particular data format may be via scanning with an appropriate Scanner 206 or by manual entry with the help of an appropriate editor 208. Pre-existing data definitions (i.e., file formats) may also be stored in internal database 114.

Scanners 206 are each operable to automatically generate a data format from an existing definition that contains the associated data format. One example of such data format scanning is described in U.S. patent application Ser. No. 11/074,502, which is herein incorporated by reference. The manual definition of an example XML document file format is shown and described below in conjunction with FIGS. 3A and 3B. Manual definitions for files of other formats maybe entered in a similar fashion with appropriate modifications using an editor 208 corresponding to the relevant file format.

Mapping module 202 is operable to allow a user to design a transformation program to transform data of a particular format (e.g. XML) via mappings from one or more source files to one or more target files. This may be accomplished via a GUI having a program palette in which a user is allowed to drag and drop source data definitions into a target data definition therein in order to perform the desired connection. Such a program palette is shown and described below in conjunction with FIG. 4. These graphical mappings by a user represents a desired movement of data from the source files to the target file.

Script Generation module 204 is operable to automatically convert the mappings captured by Mapping module 202 into a script to represent the movement of data from the source files to the target file. An example script is shown and described below in conjunction with FIGS. 5A-5C.

Figure 3A:
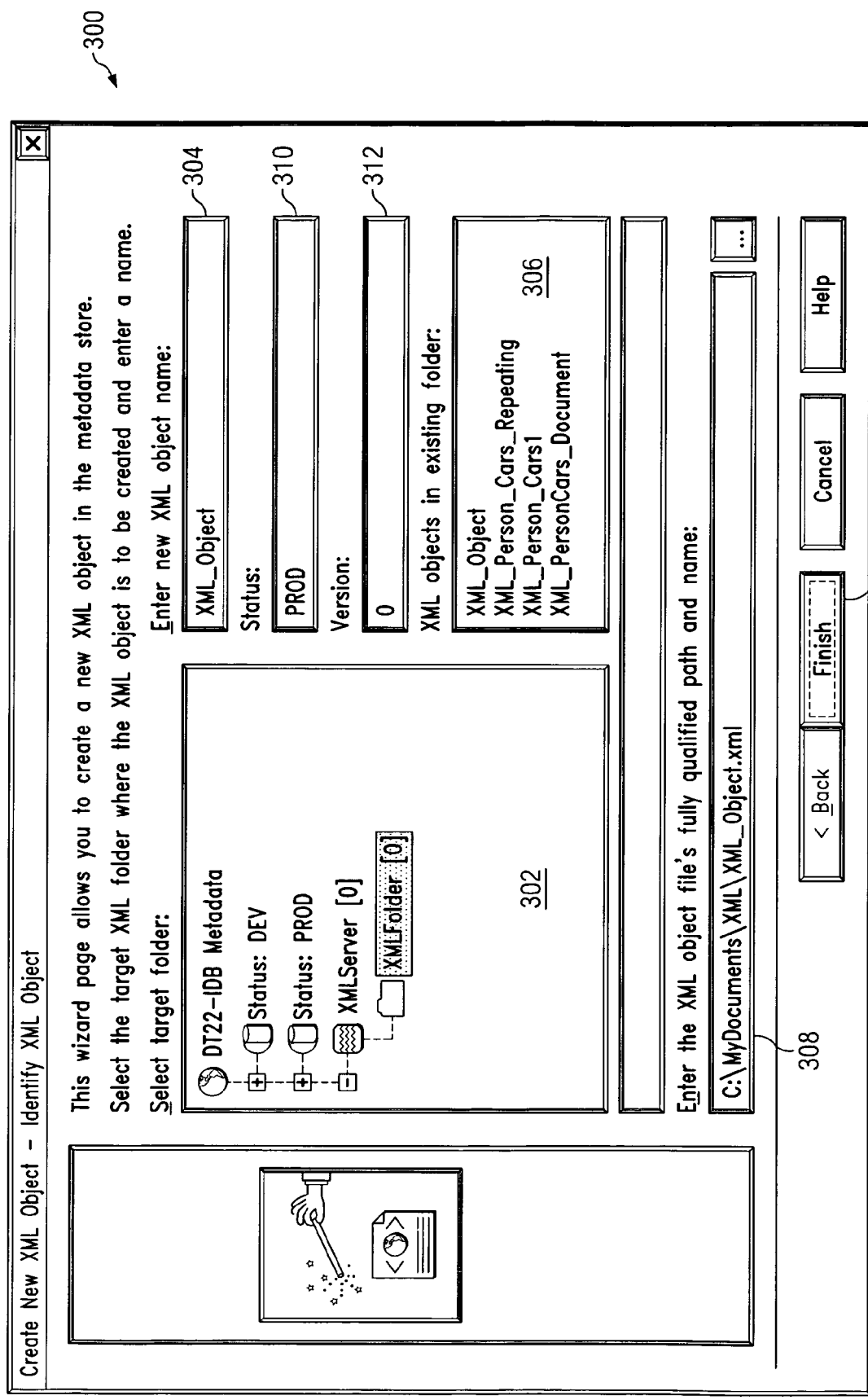
FIGS. 3A and 3B are example screen shots illustrating some functionality of an XML Object Definition of the mapper of FIG. 2.
Figure 3B:
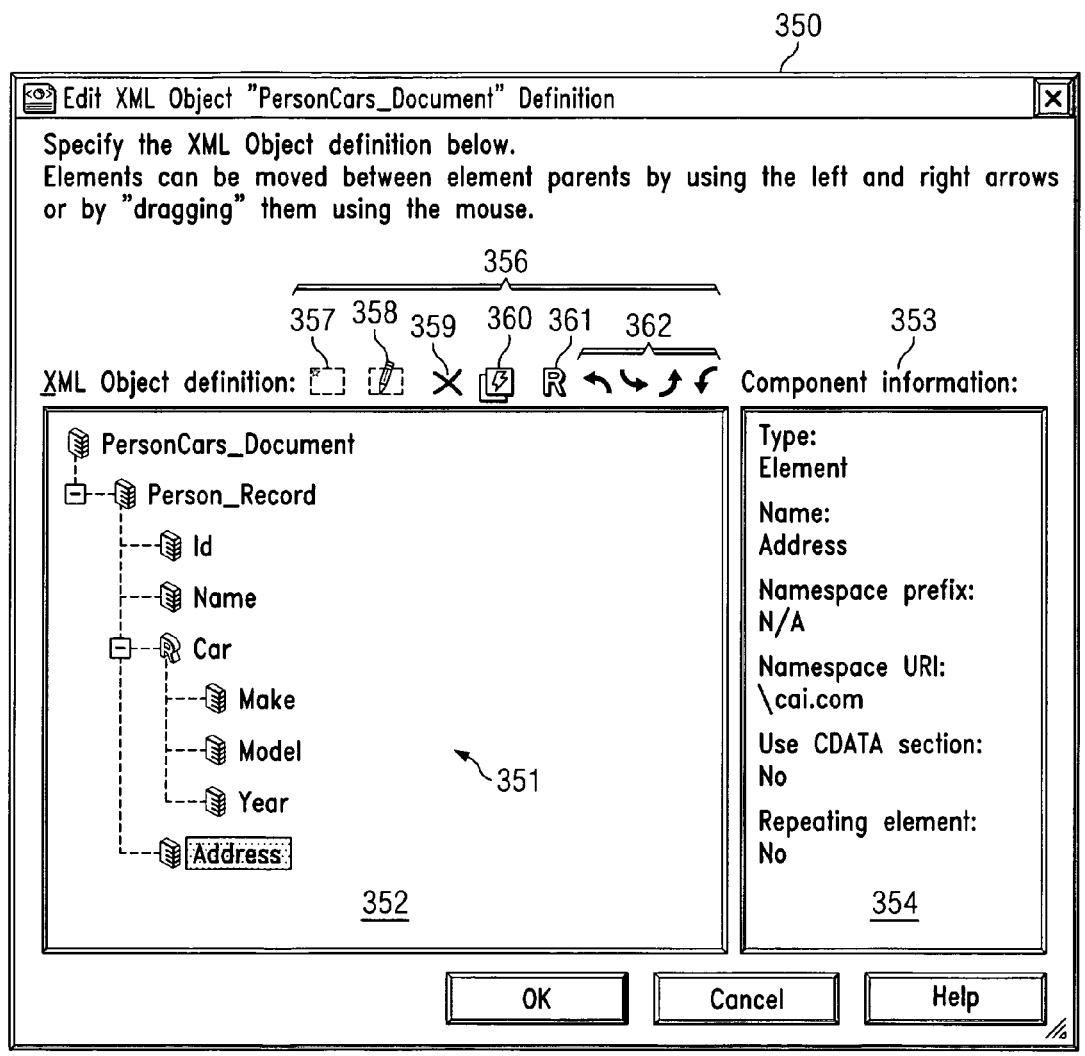

FIGS. 3A and 3B are example screen shots illustrating some functionality of XML Object Definition 200 according to a particular embodiment. Although the description below focuses for purposes of illustration on the transformation of XML data, as noted above, mapper module 102 may be configured to utilize any appropriate form of data for input and output files. Referring first to FIG. 3A, a "Create New XML Object" dialog 300 is illustrated. Dialog 300 allows a user to create a new XML object. The user may select the target folder where the XML object is to be created by using a window 302. A browser tree may be associated with window 302 from which a user may select a desired XML folder. The user may enter a name for the new XML object into window 304. A list of existing XML objects in the selected folder may be displayed in a window 306 to aid the user when defining the name of a new XML object. The XML object's fully qualified path and name may be also shown in a window 308. Other suitable windows may be associated with dialog 300, such as a status window 310 and a version window 312. Once all the desired information is entered into dialog 300, a user clicks on a Finish button 314 to create the XML object. XML Object Definition 200 then launches an "XML Object Definition" dialog 350, as illustrated in FIG. 3B below.

XML Object Definition dialog 350 allows a user to define elements, attributes, namespaces, comments, and/or other markup language components (generically referred to here as "data components") that define the layout of an XML object that the user may later use as a source or target on a program palette. The XML Object definition defines the layout of the object and controls how the data is read/written when used in a program. In the illustrated embodiment, dialog 350 illustrates an XML file format 351 in a window 352 for the PersonCars_Document file that is shown in the Create New XML Object dialog 300 above. The XML Object Definition dialog 350 allows a user to create and/or modify XML data components of an XML object that include elements, repeating elements, attributes, namespaces, and comments. An icon with a particular letter or symbol may be displayed for each component in XML file format 351. In the illustrated embodiment, an "E" is used to illustrate an element type, an "R" is used to illustrate a repeating element type, an "A" is used to illustrate an attribute of an element, an "N" is used to illustrate a namespace, and an "!" is used to illustrate a comment. Nonetheless, particular embodiments of XML Object Definition dialog 350 may use other appropriate designations.

Component information 353 describing characteristics of a particular component in XML file format 351 is displayed in a component information window 354 as a user moves a cursor over a particular component or when a user selects a single item in XML file format 351. Component information window 354 shows component information, such as the type, name, value, namespace prefix, namespace URI, use CDATA, and whether or not it is a repeating element. Dialog 350 may have a number of suitable operations 356 associated with it. A "New" operation 357 invokes an XML component dialog to create a new XML component using the currently selected element or element parent. An "Edit" operation 358 invokes an XML component dialog to edit an existing XML component. In this case, the XML file format 351 may be synchronized with the updated component data. A "Delete" operation 359 deletes the selected component and children, if desired. Deleting an element may result in deleting other XML components, such as children elements, attributes, comments, or namespaces.

Additionally, a "Validate XML file format" operation 360 may perform validation of a current file format 351. For example, in particular embodiments, the "Validate XML file format" operation 360 may perform the following checks for a particular file format, report the appropriate results, and select the offending component in the file format for further correction:

1. Verify that the namespace prefixes and URIs are correct for their relevant scope
2. Verifies that the XML data component names are valid and do not contain invalid characters.
3. Verifies that the XML data component names are unique for the scope under which they are defined.
4. Performs special tests for element names including, for example, determining whether second level (record) qualified element names are unique and determining whether the qualified names for "repeating" elements at the third level or lower are unique.
5. Checks to see if an XML file format contains valid second level elements. The definition may be invalid if it contains two or more second level elements and has repeating elements designated.

Alternative embodiments may utilize additional or alternative checks to verify the data component.

A "Repeating Element" operation 361 is used to designate an element as repeating or not repeating. The handling of repeating elements is described in further detail below. "Movement" operations 362 move a single or group of components in a particular direction to change the order of hierarchy of data components within file format 351.

Although the above description focuses on a particular embodiment of ADT 101 that supports certain functionality for "Create New XML Object" dialog 300 and XML Object Definition dialog 350, alternative embodiments may support any appropriate functionality for the creation and definition of XML objects. For example, in particular embodiments, a user may be able to drag and drop one or more data components in a single operation. In addition, a context menu or other suitable menu may be shown when a user right clicks on components of file format 351. This menu may have suitable menu items that are comparable to the operations 356 discussed above.

Figure 4:
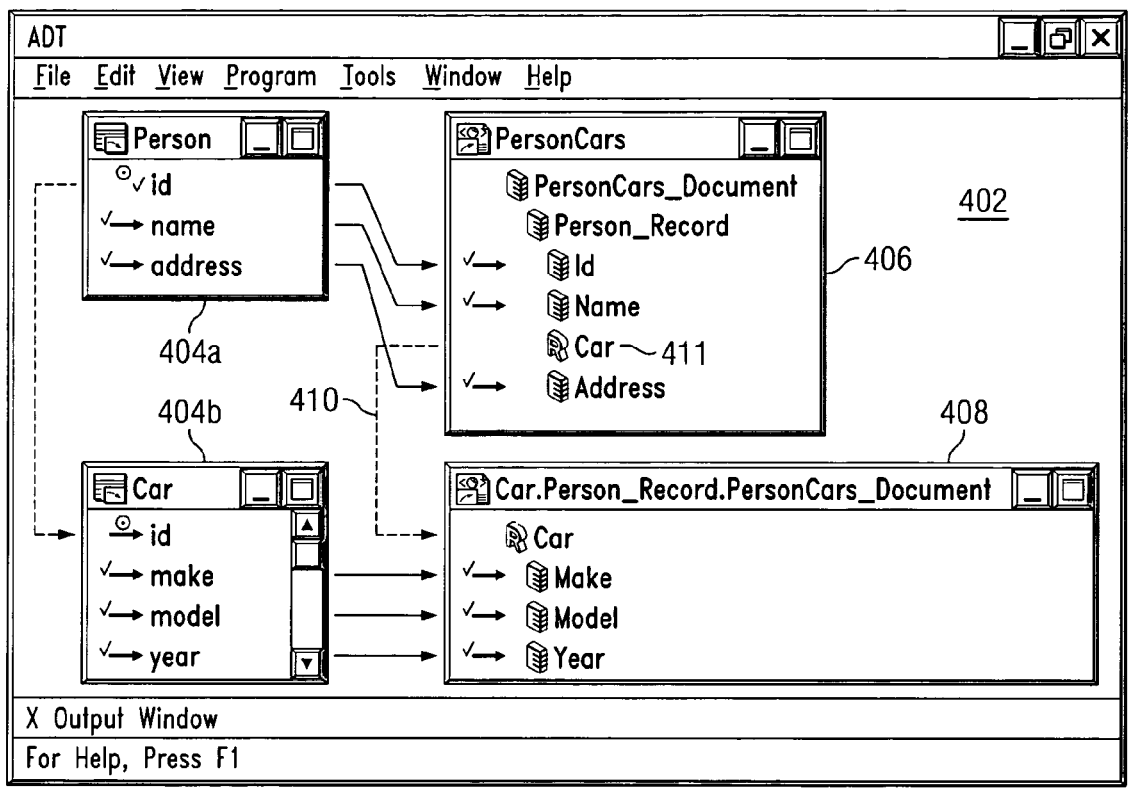
FIG. 4 is an example screen shot illustrating some functionality of an example Mapping module of the mapper of FIG. 2.

FIG. 4 is an example screen shot 400 illustrating some functionality of Mapping module 202 according to one embodiment of the invention. Screen shot 400 includes a GUI with a program palette 402 that allows a user to design a desired movement of data from one or more source database tables 404 to a target data definition 406 using one or more graphical mappings. These mappings are first facilitated by a simple dragging and dropping of data definitions into program palette 402. For example, in the illustrated embodiment, source tables 404a, 404b are dragged-and-dropped into program palette 402. In addition, a target data definition 406 is dragged-and-dropped into program palette 402. Then the individual "fields" from source tables 404a, 404b are mapped to individual elements in target data definition 406. As indicated by the arrows in program palette 402, the "id" field in source table 404a is mapped by the user to the "Id" element in target data definition 406, the "name" field in source table 404a is mapped to the "Name" element in target data definition 406, and the "address" field in source table 404a is mapped to the "Address" element in target data definition 406. In this example, a car element 411 in target data definition 406 is designated as a repeating element and has its own repeating element definition 408. Thus, there are mappings from source table 404b to repeating element definition 408. Any suitable mappings are contemplated by the present invention and are controlled by the desires of the user.

A connection indicator 410 indicates that target data definition 406 and repeating element definition 408 are related and also shows the dependency between elements and the direction of the dependency. In addition to showing the relationship between target data definition 406 and repeating element definition 408, connection indicator 410 may also maintain and enforce the correct process order for the parent/child relationships between components on program palette 402, and may enforce the correct process order when the order is manually updated in a suitable process order dialog. More specifically, the order of script statements that is produced in the resulting script uses a process order algorithm that uses the program palette source to target relationships (e.g., mappings, user-constraints, foreign keys, and repeating element connections) and produces the required DO/WHILE loops, CONNECT, SEND, LOAD, STORE, DISCONNECT, nested loops, source to target column/element assignment statements, conditional statements, transformations and other script constructs. In one embodiment, a user may be prohibited from deleting connection indicator 410.

In particular embodiments, an expand/collapse usability feature allows a user to expand and collapse the display of target object definition 406 and repeating element definition 408 on program palette 402. This feature may allow a user to see target object definition 406 in a single palette object in the same form as shown in XML Object Definition dialog 350. The collapsed view presents target object definition 406 in a form that may help aid the user when viewing the mapping relationships between other objects on program palette 402.

In the embodiment illustrated in FIG. 4, source table 404a is a database table that contains the IDs, names, and addresses of persons, and source table 404b is a database table that contains the IDs, makes, models, and years of cars associated with those persons in source table 404a. The data in source tables 404a, 404b are desired to be transformed into an XML document that has a format defined by target data definition 406, which may have been designed using the XML Object Definition 200 illustrated in FIG. 2. The example mappings in FIG. 4 are examples that illustrate the use of program palette 402 to perform graphical mappings that correspond to a transformation of data from one format to another format. Any suitable mappings are contemplated by the present invention and transformations from any suitable format to any other suitable format are contemplated by the present invention. For example, transformations may be desired from database tables to XML files, XML files to database tables, XML files to other XML files, database tables to other database tables, and/or any other suitable transformations.

Once the desired mappings are entered by a user, script generation module 204 may then, in response to a selection by the user, automatically convert the mappings into a script to represent the movement of data from source tables 404 to target data definition 406. An example script 500 is shown and described below in conjunction with FIGS. 5A-5C.

Thus, target data definition 406 and repeating element definition 408 on program palette 402 allow a user to graphically see DO WHILE loops and corresponding LOAD/STORE units that are implicit in the transformation defined by the user to be implemented by the generated script. Repeating element connections, as indicated by connection indicator 410, show control sequence of execution operations and corresponding execution loops.

Mapping module 202 supports other suitable operations and/or mapping gestures for adding, deleting, and modifying data definitions defined in a transformation program. Mapping module 202 also contains special operations for selecting, updating, and moving objects on program palette 402. In addition, it includes a unique "Generate Layout" feature that arranges the palette objects for main data definition 406 and repeating element definition 408 using non-overlapping hierarchical representation as defined in XML file format 351 (FIG. 3B). This feature is useful for automatically generating a layout that shows the parent/child relationships and hierarchy without using dialog 350 as a reference.

FIGS. 5A, 5B, and 5C illustrate an example script 500 for transforming XML data according to one embodiment of the invention that is generated by script generation module 204 (FIG. 2). As described above, in particular embodiments, a user may define a transformation program via the graphical mappings by dragging various source data definitions and target data definitions onto a program palette. In one embodiment, each definition on the program palette is represented in memory as a C++ object, which includes information about whether the file is a source or a target, whether the data is a table in a relational database or an XML file, and what columns or elements participate in the transformation. When the user maps a column or element of one source to a column or element of a target, an in-memory C++ connection object is created containing the source/target information.

During script generation, the information in the in-memory palette source/target and connection objects is translated into data structures that are used to define the corresponding script code and corresponding script structures used during the script creation process. Whereas the first in-memory palette and connection objects represent the appearance of the program on the program palette, the later script data structures represent the processing implied by that appearance. A list of script data structures may be used to represent such granular pieces of processing as CONNECTing to a database table, starting a DO WHILE loop to LOAD a row of a source table, assigning the value of one script variable to another, STORing a row to a target table, or terminating a DO WHILE loop.

Finally, a number of passes are made through the array of script data structures to write out actual script statements to define the standard script constants, script structures to hold table column values, data profile names, and the actual CONNECT/DO WHILE/LOAD/IF/assignment/STORE/DISCONNECT processing statements.

As shown in FIGS. 5A-5C, example script 500 may define an array 502 and a transformation routine 504. The array 502 is an example of how an XML file format or data definition may be defined within the programming code. Whereas LOAD and STORE handlers for other interfaces, such as database interface 116, may take a #DATA parameter (as shown by the line of code at reference numerals 512) that specifies a structure within which each field corresponds to a column within a database table, the #DATA parameter (as shown by the line of code at reference numeral 514) for XML LOAD and STORE handlers, according to particular embodiments, specifies an array of structures. Each of the structures in the array corresponds to an element, attribute, namespace, or comment specified in the XML document. As one example, the structure may look like this:

```
TYPE xmlComponentDef AS STRUCTURE
(
comp_name          STRING, REM* Element tag, attribute name,
                   or null
comp_value         STRING, REM* character value of element
                   or attribute
comp_type          INT,                          REM*
0=attribute,1=element,2=namespace,3=comment
comp_id            INT, REM* id of the component
comp_parent        INT, REM* id of the parent element-type
                   component
comp_namespaceURI  STRING, REM* full URI of namespace
comp_NS_Prefix     STRING, REM* prefix for namespace
                   qualification
comp_IsCDATA       BOOLEAN, REM* TRUE = data to be
                   wrapped in CDATA
tags
comp_datatype      INT, REM* datatype of element
comp_IsRepeating   BOOLEAN, REM* TRUE = element may
                   repeat
comp_level         INT, REM* level of the component
)
CONST _comptype_attribute = 0
CONST _COMPTYPE_ATTRIBUTE = 0
CONST _comptype_element = 1
CONST _COMPTYPE_ELEMENT = 1
CONST _comptype_namespace = 2
CONST _COMPTYPE_NAMESPACE = 2
CONST _comptype_comment = 3
CONST _COMPTYPE_COMMENT = 3
```

In the illustrated example, the fields are defined as follows:

```
comp_name         - simple name of element or attribute or text
                    of comment
comp_value        - character value of element or attribute
comp_type         - 0=>element, 1=>attribute, 2=>namespace
                    component, 3=>comment
comp_id           - a unique number to identify a component;
                    sequentially assigned
    starting with zero
comp_parent       - id of this component's parent component
comp_namespaceURI    - the Uniform Resource Identifier for
                       the component's
    namespace
comp_NS_Prefix    - the prefix associated with the
                    namespaceURI
comp_IsCDATA      - used to indicate that the character
                    value may contain
    problematic characters like <, >, ", ', or &
comp_IsRepeating  - indicates an element may repeat zero
                    or more times in the
    XML definition
comp_level        - hierarchical level of the component, starting with
                    zero for the root
    element
```

As described further below, by creating an array of xmlComponentDef structures and then setting the value of the various fields based on the data read from the source file, XML interface 600 can create a data structure holding all of the data necessary for the defined transformation.

Since data is being transformed into XML format, XML interface 600 (FIG. 1), in this example, is called by server 106 to help perform the transformation. Details of XML interface 600 and its associated communication handlers are described in greater detail below in conjunction with FIG. 6.

The CONNECT handler (see reference numeral 509) establishes a connection to XML interface 600 and references an XML profile. The SEND handler (see reference numerals 510) is called before the LOAD handler (see reference numerals 512), and prepares the XML interface 600 for the load. The LOAD handler 512 loads data from a source file into an array element that is passed by the example script 500. The STORE handler 514 is used to create the specified target file from the target data definition that is passed by example script 500 to XML interface 600. The DISCONNECT handler (see reference numeral 519) disconnects from the XML interface 600.

With respect to the LOAD handler, #FILE may be used to specify the name of the file from which the XML document may be read. #DATA may be required to specify the array of structures that describe the XML document to be read. #repeating_element_index is used on the LOAD of a repeating element and specifies the element's index in the array of structures.

While parsing the XML file, particular embodiments of the LOAD handler may set the values of the various structure fields according to the following guidelines:

```
comp_name     - for elements and attributes, this field stores the
                name of the relevant
    data component
comp_value    - initialized to NULL by the LOAD handler at the
                beginning of the
    load. May be set to the value contained in the document if
    the corresponding
    data component is contained in the document
comp_type     - elements (0), attributes (1), namespaces (2), and
                comments (3).
```

```
comp_id, comp_parent and comp_level         -
comp_namespaceURI   - can be specified if the document contains
                      a namespace URI;
    otherwise may be left NULL or set to a null string ("")
comp_IsRepeating    - set to TRUE if the element repeats; set to
                      FALSE otherwise
```

With respect to the STORE handler, #FILE may be used to specify the name of the file to which the XML document may be written (see reference numeral 516). #DATA may be used to specify the array of structures that define the components of the XML document to be created. #repeating_element_index may be used on the STORE of a repeating element and specifies the element's index in the array of structures. Special notes on the use of structure fields for the STORE handler is as follows:

```
comp_name           - required for elements, attributes, and comments;
                      namespace prefix
    name for namespaces
comp_value          - optional for elements; required for attributes; ignored
                      for namespaces
    and comments
comp_type, comp_id, comp_parent and comp_level - all required
comp_namespaceURI   - ignored for elements, attributes, and
                      comments; required for
    namespaces
comp_NS_Prefix      - optional for elements, attributes, and
                      namespaces; ignored for
    comments
comp_IsCDATA        - may be specified as TRUE if the element
                      value is to be
    wrapped in CDATA delimiters. May be set to FALSE or
    left NULL
    otherwise
comp_IsRepeating    - set as TRUE if the element repeats; set to
                      FALSE otherwise
```

After the generation of example script 500, mapper module 102 (FIG. 1) stores example script 500 in internal database 114 for later execution by server 106. Script manager 104 may later schedule example script 500 for execution by server 106. When server 106 is ready to execute example script 500, it calls on XML interface 600 as shown and described below in conjunction with FIG. 6.

Repeating Elements—Additional Information

As described above, XML Object definitions may have an additional "repeating" property added to an element in an XML Object definition (for example, Car element in XML file format 352). This property is used to indicate if a particular element (and its children) in the XML Object definition has data that repeats in the associated XML document. The repeating property of the element is later used when the XML Object definition is added to a program (see, e.g., repeating element definition 408 in FIG. 4) to create "repeating element" XML definitions for each element with the "repeating" property. Repeating element XML definitions in a program provide the means of accessing a particular repeating element and its children for structure assignments in a script and processing distinct LOAD and STORE operations inside a program. This feature may provide the necessary control and flexibility in the program to handle special LOAD/STORE processing required for the repeating data.

In particular embodiments of ADT 101, all elements in the XML definition except for the document root and any second level elements may be defined as repeating. The repeating property is not applicable to attributes, namespaces, and comments. The repeating property may be designated on child elements that are designated as repeating and so forth down the hierarchy as needed. A user may specify if an element is repeating or non-repeating in the XML Object Definition dialog (e.g., dialog 350 in FIG. 3B). The user may specify the repeating property from an XML Component dialog or directly from the element component in the XML Object Definition dialog via a context menu.

Moreover, in particular embodiments of ADT 101, the following rules may govern the use of repeating elements:

1) Root and second level elements can not be designated as repeating. Consequently, second level element names are assigned unique.

2) Element names for third or lower level elements do not have to be unique as long as they are not designated as repeating.

3) Elements designated as repeating are assigned unique names for a given parent element.

4) XML Object definitions can only have a single second level element if that second level element includes one or more "repeating" elements. By contrast, multiple second level elements may be supported for XML objects without repeating elements.

The main-element (such as main element 406 in FIG. 4) and repeating-element (such as the repeating Car element 408 in FIG. 4) XML palette objects are considered a single entity for LOAD and STORE processing. That is, a single XML definition structure is used in the script to set/get values in common memory for. LOAD and STORE processing of the XML document stream.

Each repeating-element definition may allow operations to be performed such as mappings, user constraints and process order specification and may follow the existing rules consistent with other objects on the palette such as tables, records, and views. When user drags and drops the XML object definition containing elements with the repeating property onto a program palette, the main XML definition 406 and all the associated repeating-element definitions 408 are shown, as illustrated in FIG. 4.

The name of the palette objects for repeating-element definitions may be derived from the name of the main XML definition. For example, "PersonCars" main XML Object definition is the name of the XML object in the illustrated example. The repeating-element definition may use the element name for the repeated-element definition followed by the parent elements up to the document root in the main XML Object definition with a period "." separating each name.

For example, "Car.Person_Record.PersonCar_Document" is the name derived for the repeating-element definition for the repeating Car element shown in FIG. 4. If the final name is not unique for the palette object, a number may be appended to the element name to make it unique (e.g., Car2.Person_Record.PersonCar_Document). In particular embodiments, the name of the palette objects regardless of type (tables, records, views, Reusable Transformations, Lookups, etc.) will be unique in a given program. The unique palette name is used to identify the object to processing steps (LOAD, STORE, INVOKE) in a program.

In the "Car.Person_Record.PersonCar_Document" repeating-element definition 408, the fully qualified path for the Car element to Person_Record (parent) 408 and PersonCars_Document (grand parent) is shown in the palette object name. The fully qualified path uniquely identifies a repeating-element definition such that the user may differentiate between two or more repeated-element definitions having the same element name but different parents. In particular embodiments, the user may be prevented from creating mappings and user constraints to/from the parent component for Car in the parent element of the repeating-element definition in this example. That is, in such embodiments, mappings and user constraints may not be created on the Car element in the Person_Cars palette instance, they may be create on the Car element in the Car.Person_Record.PersonCar_Document repeating-element definition.

The format for repeating-element definitions is considered separate but implicitly associated with the repeating-element definitions in the related main XML definition and may be visible in the program palette. That is, the format maintained in the main XML definition is used to define the corresponding repeating element definitions on the program palette and "appear" as separate addressable palette objects (406 and 408) from the user's perspective. This approach keeps all the formats in a single location in the metadata store for the repeating-element structure and reduces the amount of duplicated data that would be needed in an approach that uses separate repeating-element XML object metadata definitions in the metadata store.

When a user makes a modification to a main XML Object definition (such as by using the XML Object editor shown in FIG. 3B), the program palette objects are updated to reflect the new structure. The program synchronization routines may recreate/restructure the main/repeating element definitions while trying to maintain existing mappings and preserve existing repeating element definitions if possible. Synchronization of the XML Object definitions occurs on program open, program import, and when XML objects are edited while programs are open.

The use of "repeating-element" XML Object definitions is important to allow the user to graphically see the implied DO WHILE loops that may be generated in the script. In addition, this construct may allow the user to control how each "repeating-element" XML Object definition may be processed in program and resulting script. Handling of multiple repeating elements in a single XML definition may require having separate LOAD/STORE loops for each repeating element. The user may create as many repeating-element XML definitions as necessary to correctly processing the XML definition.

In particular embodiments, the LOAD and STORE calls generated in the script may have additional parameters and structures to uniquely identify each part of the XML definition (main or repeating-element) being processed for a particular LOAD and STORE call. This may be handled by passing the index of the "repeating element" to be processed as an additional parameter to the LOAD or STORE statements (for example, using #repeating_element_index parameter as shown at reference numeral 514). A single profile may be used for the main and repeating-element XML Object definitions on the program palette since they use the same script structure and memory for the "related" LOAD or STORE statements in the script. However, the "PersonCars" (main) and "Car.Person_Record.PersonCars_Document" (repeating-element) XML Object definitions from above are handled using separate LOAD or STORE operations in the script.

An XML interface 600 may save/stage the data for repeating child elements to cache both on LOAD and STORE calls in the script. In particular embodiments, STORE statements for repeating-element definitions always stage the data to the memory. When the main record is STOREd then all of its data, including the staged repeating elements, gets written to the XML target file. The LOAD process begins with the LOAD of the entire record. All of the non-repeating data for the root record is returned, while the data for repeating child elements is staged to a cache. On subsequent LOADs for the child portions, this data is extracted from cache and returned.

Figure 6:
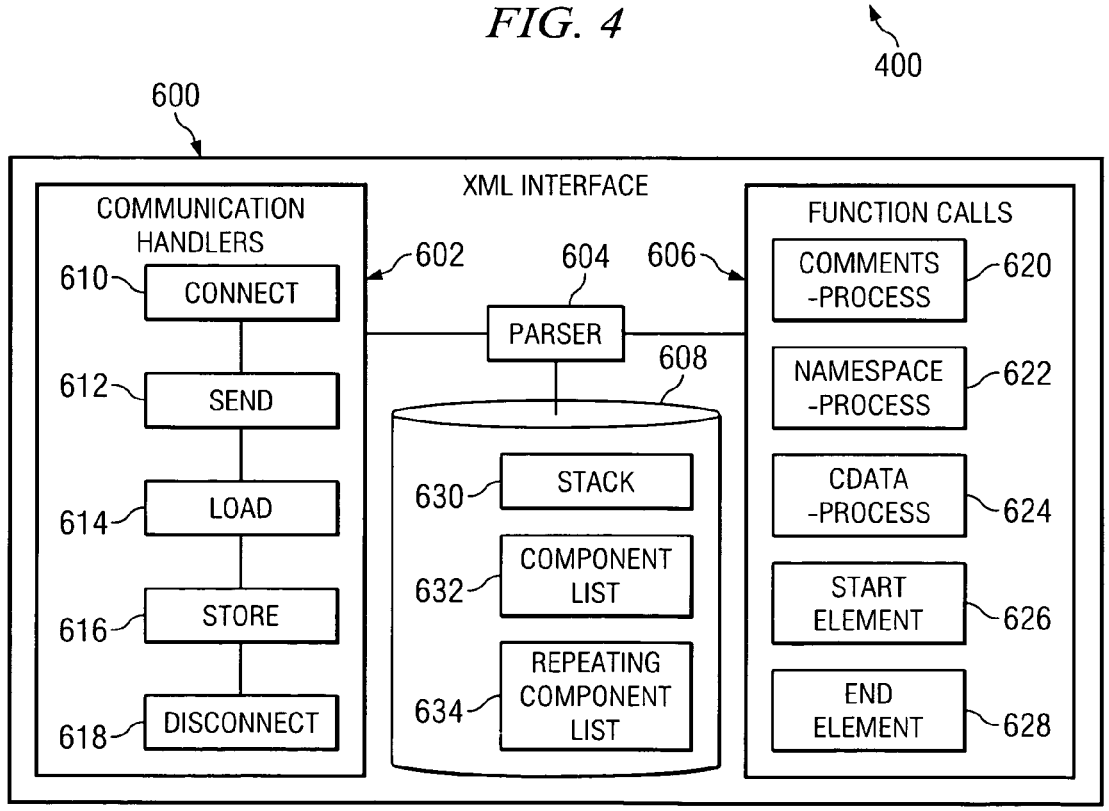
FIG. 6 is a block diagram illustrating an XML Interface for data manipulation according to one embodiment of the invention.

FIG. 6 is a block diagram illustrating XML interface 600 according to one embodiment of the invention. In the illustrated embodiment, XML interface 600 includes a plurality of communication handlers 602, a parser 604, a plurality of function calls 606, and a cache 608. The present invention contemplates more, fewer, or different components than those shown in FIG. 6.

As described above, rather than passing data through a structure in which each structure field translates to a table column or file field, XML interface 600 may pass an array structure, and each element of the array may correspond to an XML component. The array structure may contain the information required to format an XML file, and may be derived from the XML file format 351 as described above (FIG. 3B).

For the STORE handler, XML interface 600 may simply traverse the array structure and write out the structure to the file in XML format. For the LOAD handler, XML interface 600 may first parse a given XML object until locating an element corresponding to the root node of the record passed in. XML interface 600 may then parse the XML file and try to map the components encountered to their corresponding fields in the array. In one embodiment, XML components that have no corresponding field may be discarded. Array fields that have no counterpart in the XML file may be left NULL.

Communication handlers 602 generally provide a common function set that enables Server 106 to interact with different databases or data formats. Communication handlers 602 may establish and terminate connections, issue queries and other suitable commands, and move data to and from a database or other suitable data repository. A particular interface converts these common script functions into database-specific code. In the illustrated embodiment, communication handlers 602 include a CONNECT handler 610, a SEND handler 612, a LOAD handler 614, a STORE handler 616, and a DISCONNECT handler 618.

Generally, CONNECT handler 610 allows the connection to XML interface 600 in order to connect with source files and target files when server 106 desires to execute a script. SEND handler 612 prepares XML interface 600 for a LOAD call by passing initial information to parser 604. This call may initialize the "XML file" object, and prepare the XML file to be a source file. LOAD handler 614 works in conjunction with parser 604 and may iteratively parse each successive element until the end of a record is reached. At that point, parsing may wait and the array described above may be returned with the data portion filled in. STORE handler 616 may cause the passed array of element structures to be written to the XML file format or cache 608 depending on the type of element being processed. The structure may contain the field names, hierarchy information, and the data. XML interface 600 may run this structure and generate the indicated XML to the XML file associated with the profile. DISCONNECT handler 618 writes out any element tags that are still pending, frees any parser resources, closes the source and target files, and disconnects server 106 from XML interface 600.

Parser 604 may be any suitable computer program operable to read one data line at a time during the LOADing of data from a source file. Parser 604 makes particular calls to function calls 606 based on the data read in order to perform its functions. For example, function calls 606 may include a comments-process function call 620, a namespace-process function call 622, a CDATA-process function call 624, a start element function call 626, and an end element function call 628.

Cache 608 may be any suitable storage unit or database and may take the form of volatile or non-volatile memory including, without limitation, magnetic media, optical media, random access memory, read-only memory, removable memory, or any other suitable local or memory component. In the illustrated embodiment, cache 608 includes a stack 630, a component list 632, and a repeating component list 634. Stack 630 functions to keep track of where parser 604 is in an XML tree structure when XML interface 600. Component list 632 temporarily caches data from a particular source file or target file during a LOAD call and repeating component list 634 temporarily caches data for the repeating elements during a particular LOAD call. This is described in further detail below in conjunction with FIGS. 7A and 8 below.

To support STORing of repeating elements, repeating records, and nested repeating records, example script 500 stores the repeating data first followed by the non-repeating data. First, example script 500 determines what type of data is being processed, e.g., a repeating record, repeating element or non-repeating data. Example script 500 determines this by using a repeating index passed on the STORE call from example script 500. Next, if example script 500 determines that a repeating record is being processed then the size of the record (that is, the start and end indexes of the record) is calculated.

Repeating component list 634 maintains the list of all active repeating records being processed. Any time a repeating record is parsed, the parsing routines add a new reference to repeating component list 634. When a repeating component is parsed, repeating component list 634 is scanned to determine if the record is a member of this list (has been processed before). If so, XML interface 600 identifies the parent of the repeating component from repeating component list 634. On STORE of the main component, the non-repeating data is recorded in component list 632. A call is subsequently made to STORE handler 616 to write out the XML record.

While processing a repeating record, a check for nested repeating record scans for any nestings of repeating data. All repeating data may have their own LOADs, which may each cause a new in-memory cache data area to be added in the component. Parsing routines, while building the list, will save the component data in the in-memory cache and LOAD handler 614 will then process the data if the Component Ids match a Component Id that is to be processed next.

Figure 7A:
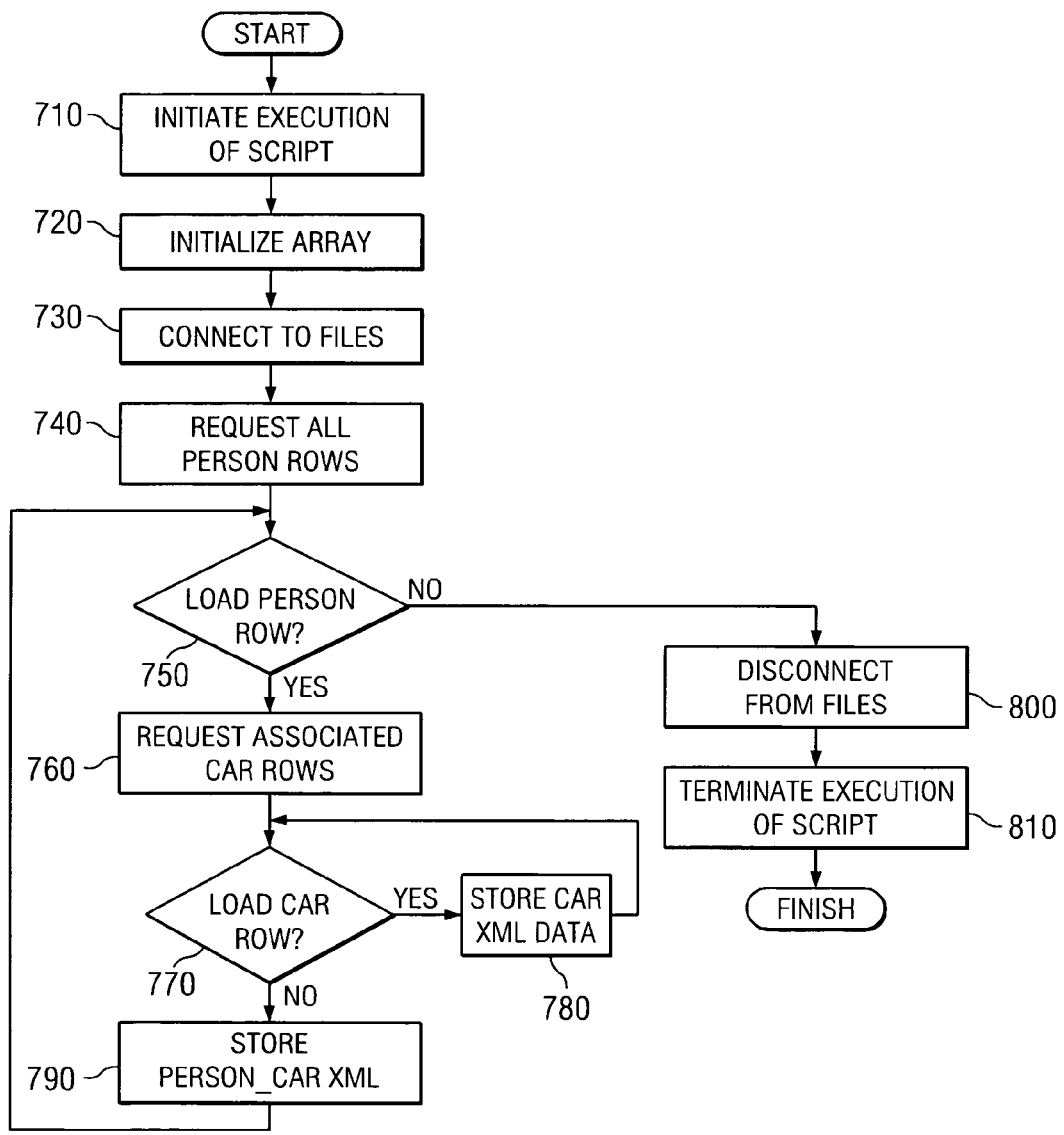
FIG. 7A is a flowchart illustrating an example method of executing a script to perform a first transformation of data from a database source file to an XML target file according to one embodiment of the invention.
Figure 8:
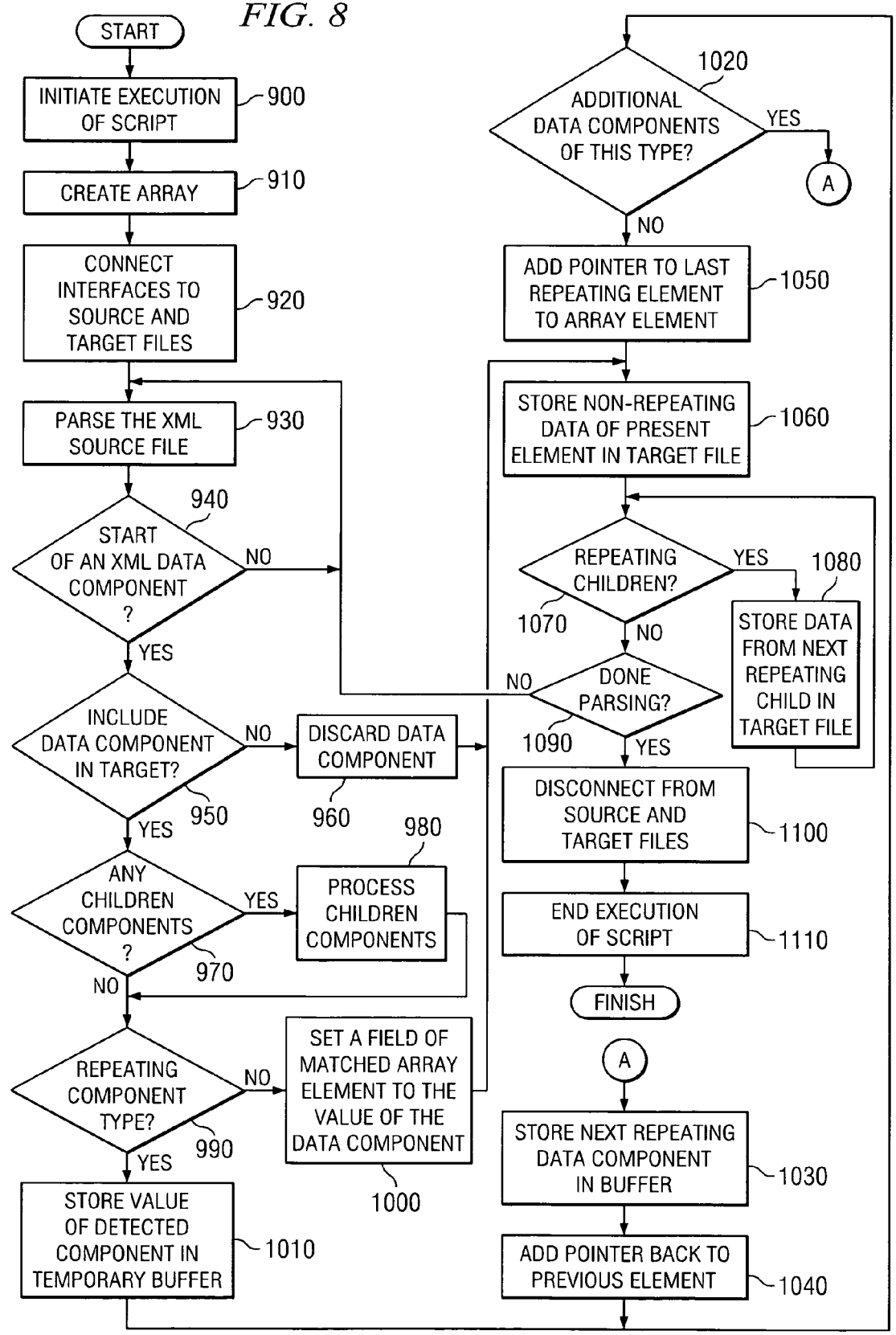
FIG. 8 is a flowchart illustrating an example method of executing a script to perform a second transformation of data from an XML source file to a database target file according to one embodiment of the invention.

FIGS. 7A-7B and 8 illustrate example operation of XML interface 600 in executing a transformation script such as the one shown in FIGS. 5A-5C. In particular, FIG. 7A illustrates example operation of XML interface 600 in executing an example script to transform input data stored in rows from a database table into an XML output file, while FIG. 8 illustrates example operation of XML interface 600 in executing another example script to transform input data stored in an XML-format source file to rows in a database table. In general, however, XML interface 600 may be configured to transform input data from an XML-format source file into a target file of any appropriate format. As indicated above other possible target file-to-source file combinations may include, but are not limited to XML file-to-XML file, flat file-to-XML file, and XML file-to-flat-file transformations.

FIG. 7A is a flowchart illustrating steps that may be taken by server 106 and XML Interface 600 in executing the example script 500 shown in FIGS. 5A-5C to transform a portion of a particular set of database tables (referred to generically here as the "source files" for this transformation) into an XML document having a particular format (referred to generically as the "target file" in this transformation). More specifically, FIG. 7A illustrates the transformation of a plurality of PERSON rows from a PERSON table and a plurality of associated CAR rows from a CAR table into a plurality of XML records that each includes information about a particular person and one or more cars associated with that person.

The process begins at step 710 with server 106 initiating execution of the generated script. At step 720, server 106 creates array 502 describing the target data definition (here, the PersonCars XML Object definition) and initializes one or more values of its various array elements. For example, using example script 500 illustrated in FIGS. 5A-5C as an example, during initialization server 106 creates the "PersonCars_Document" array and sets the "name," "type," "id," "parent," and "level" of each element of the "PersonCars_Document" array based on the PersonCars XML data definition that was supplied at the time of script creation.

At step 730, the relevant interfaces CONNECT to the source file and target file. In particular here, XML interface 600 issues a CONNECT to connect to the XML target file, while database interface 116 issues CONNECTs to the "Person" table and the "Cars" table in the relational database associated with database interface 116. At this point, server 106 may also initialize other operational variables, clear temporary memory, and/or perform any other steps appropriate to facilitate input and output to the relevant files.

The appropriate interface then begins reading data from the source file. Here, database interface 116 begins reading data from the relevant database tables. In particular, database interface 116 transmits a SEND request to the PERSON table to request all PERSON rows at step 740. These PERSON rows may then be buffered in temporary memory by database interface 116 until needed.

At step 750, server 106 determines whether another PERSON row can be loaded from those stored in memory by issuing a LOAD call on the PERSON table. If server 106 determines that no more rows remain to be processed, server 106 continues operation at step 800. If, instead, server 106 determines that additional rows remain to be processed, server 106 accesses the next remaining PERSON row and transforms the data in this PERSON row for output to the target XML file. As part of this process, server 106 may also iteratively process any repeating data elements associated with this PERSON row.

For example, in the illustrated example, server 106 transmits a SEND request to the CARS DBMS table to request the CAR rows having a particular ID value at step 760. These CAR rows may then be buffered in temporary memory. At step 770, server 106 determines whether any CAR repeating elements remain to be processed by issuing a LOAD on the identified CAR rows. If server 106 determines that no more CAR rows remain to be processed for this particular PERSON row, server 106 continues operation at step 790. If, instead server 106 determines that additional CAR rows remain to be processed for this particular PERSON row, server 106 accesses the data in the next remaining CAR row and issues a STORE for the relevant CAR row at step 780. As a result of the STORE, data from this CAR row will be cached internally by XML interface 600 along with other data previously cached for the repeating XML data component type associated with these CAR rows. In particular embodiments, this data may saved in the buffer until being written to the target XML file when the STORE for the parent data component is processed (e.g., at step 790 in this example). Additionally, in particular embodiments, server 106 may also format or otherwise modify the data extracted from the relevant CAR rows to match the target data definition associated with the target file. For example, server 106 may modify the format of a model year stored in a particular CAR row to match the target year format associated with the data definition for the target XML file.

Once the appropriate data for a particular data component in the target XML file has been buffered, including any appropriate repeating elements, XML interface 600 writes the data component to the target XML file. More specifically, in the illustrated example, XML interface 600 writes out a Person_Car XML record to the target XML file at step 790. Operation then returns to step 750 and server 106 attempts to LOAD another PERSON row.

Once data for all of the XML data components has been LOADed from the appropriate source files, database interface 116, XML interface 600 and server 106 may complete any steps appropriate to finalize the transformation and close the source file and target file. In the illustrated example, as part of this process, server 106 performs a write of the last remaining XML data component to the target XML file, and XML interface 600 and database interface 116 issue DISCONNECTs to the target XML file and source database tables respectively at step 800. At step 810, server 106 completes execution of the example script and terminates operation with respect to this particular data transformation. The target XML file may now be viewed by an appropriate XML editor.

FIG. 7B is an example output of the example method of FIG. 7A according to one embodiment of the invention. As indicated in FIG. 7B, an XML file 798 is illustrated in which car data for particular persons are arranged in an XML format. This data was extracted from database tables, such as source tables 404a, 404b (FIG. 4).

FIG. 8, as noted above, illustrates an example operation of XML interface 600 in executing another transformation. In particular, FIG. 8 illustrates operation of server 106 and XML Interface 600 in executing another example script (not shown) generated to transform the data in the XML file shown in FIG. 7B (representing the source file for this transformation) into an arrangement of DBMS rows (representing the target files in this transformation) having a particular format. Moreover, FIG. 8 provides additional detail for some of the high-level steps identified in FIG. 7, with respect to how these steps might be implemented in a particular embodiment of system 100.

The process begins at step 900 with server 106 initiating execution of the script generated to perform this transformation. At step 910, server 106 creates an array describing desired data that will be stored in the target files (here, the fields of the PERSONS rows and the associated CARS rows) based on the target data definition defined by the executing script. Server 106 additionally initializes one or more values of the various array elements in this array.

At step 920, the relevant interfaces CONNECT to the source file and target file. In particular here, XML interface 600 issues a CONNECT to connect to the XML source file, while database interface 116 issues CONNECTs to the "Person" table and the "Cars" table in the relational database associated with database interface 116. At this point, server 106 may also initialize other operational variables, clear temporary memory, and/or perform any other steps appropriate to facilitate input and output to the relevant files.

At step 930, XML interface 600 begins parsing the XML source file 798 which includes multiple XML data records. While parsing, XML interface 600 determines at step 940 whether XML interface 600 has reached the start of an XML data component (e.g., based on the detection of a start delimiter in the parsed data). When XML interface 600 determines that it has detected the beginning of an XML data component, XML interface 600 determines, at step 950, whether this data component should be included in the target file. In particular embodiments, XML interface 600 may determine whether to include the detected data component by traversing the array and determining whether the "Name" field of any array element matches the name of the detected XML component. If not, XML interface 600 discards the detected data component at step 960 and proceeds with parsing at step 1060.

If, instead, XML interface 600 is able to match the name of the detected XML component to the "Name" field of one of the array elements, XML interface 600 processes the data component for inclusion in the array. As part of this process, XML interface 600 determines, at step 970, whether the detected data component has any children components. If so, XML interface 600 parses and processes the children components, at step 980, in a similar fashion deciding whether each should be included in the array. (Although shown, for the sake of simplicity, as a single box, this process may, depending on the hierarchy of the detected children, be an iterative process that follows a flow similar to that taken to process the detected parent component.)

XML interface 600 then determines at step 990 whether the detected data component is of a repeating component type. In particular embodiments, XML interface 600 may determine this by checking a field, such as an "IsRepeating" field of the array 502 illustrated in FIG. 5A. If XML interface 600 determines that the detected data component is not of a repeating component type, XML interface 600 sets a field (e.g., a "Value" field) of the matched array element to the value of the detected data component at step 1000. As a result, data from matched data components will be stored in their corresponding array elements.

If XML interface 600 determines that the detected component is of a repeating component type, XML interface 600 stores the value of the detected component in a temporary buffer at step 1010. XML interface 600 then determines if there are additional data components of the same component type immediately following the detected component at step 1020. If so, XML interface 600 stores the next repeating data component in the buffer at step 1030 and adds a pointer back to the previous repeating element at step 1040. XML interface 600 then returns to step 1020. Once all repeating elements of that component type have been stored in the buffer, XML interface 600 adds a pointer to the last repeating element of that type to a field (e.g., a "Value" field) of the matched array element (i.e., the array element that originally matched the name of the first data component of this repeating type) at step 1050. XML interface 600 then returns to parsing the remainder of the source XML file.

At step 1060, the interface 108 associated with the target file, in this case data base interface 116, issues a STORE on any non-repeating data from the currently-parsed data component, thereby writing the non-repeating data to the target file. XML interface 600 then determines whether the currently-parsed data component has any repeating children at step 1070. If so, XML interface 600 retrieves, from the memory buffer, data from one of the repeating children and database interface 116 issues a STORE on this repeating child data, writing the data to the target file at step 1080. XML interface 600 and database interface 116 repeat this process until all of the repeating children have been stored, returning to step 1070 until no more children remain in memory.

As one example, in the described configuration, the target files represent associated rows in the PERSONS and CARS tables. As a result, database interface 116 may write the values stored in a particular field (e.g., a "Value" field) of the array elements associated with non-repeating component types to a PERSON row in the PERSON table. Database interface 116 then accesses the memory location identified by the pointer stored in the array elements associated with any repeating component types, here the CARS data components, and writes the values stored at that location to the target files in the appropriate manner based on the type of target files. In the illustrated example, database interface 116 creates a CAR row for each CAR data component and adds it to the CARS table. Because the associated PERSON row was already created and added to the PERSONS table, database interface 116 can also incorporate an ID identifying the associated PERSON row into each of the newly-created CAR rows.

After database interface 116 stores or saves the appropriate data, XML interface 600 determines whether it has completed parsing the XML source file at step 1090. For example, in particular embodiments, XML interface 600 may determine if it has completed parsing the last data component based on whether or not XML interface 600 has detected an end delimiter associated with the root data component. If XML interface 600 has not completed parsing the XML source file, XML interface 600 returns to step 930 and continues parsing the XML source file.

If, instead, XML interface 600 determines that it has finished parsing the XML source file, XML interface 600, database interface 116, and server 106 may complete any steps appropriate to finalize the transformation and close the source file and target file. As part of this process, XML interface 600 and database interface 116 issue DISCONNECTs to the target XML file and source database tables respectively at step 1100. At step 1110, server 106 completes execution of the example script and terminates operation with respect to this particular data transformation.

Figure 9:
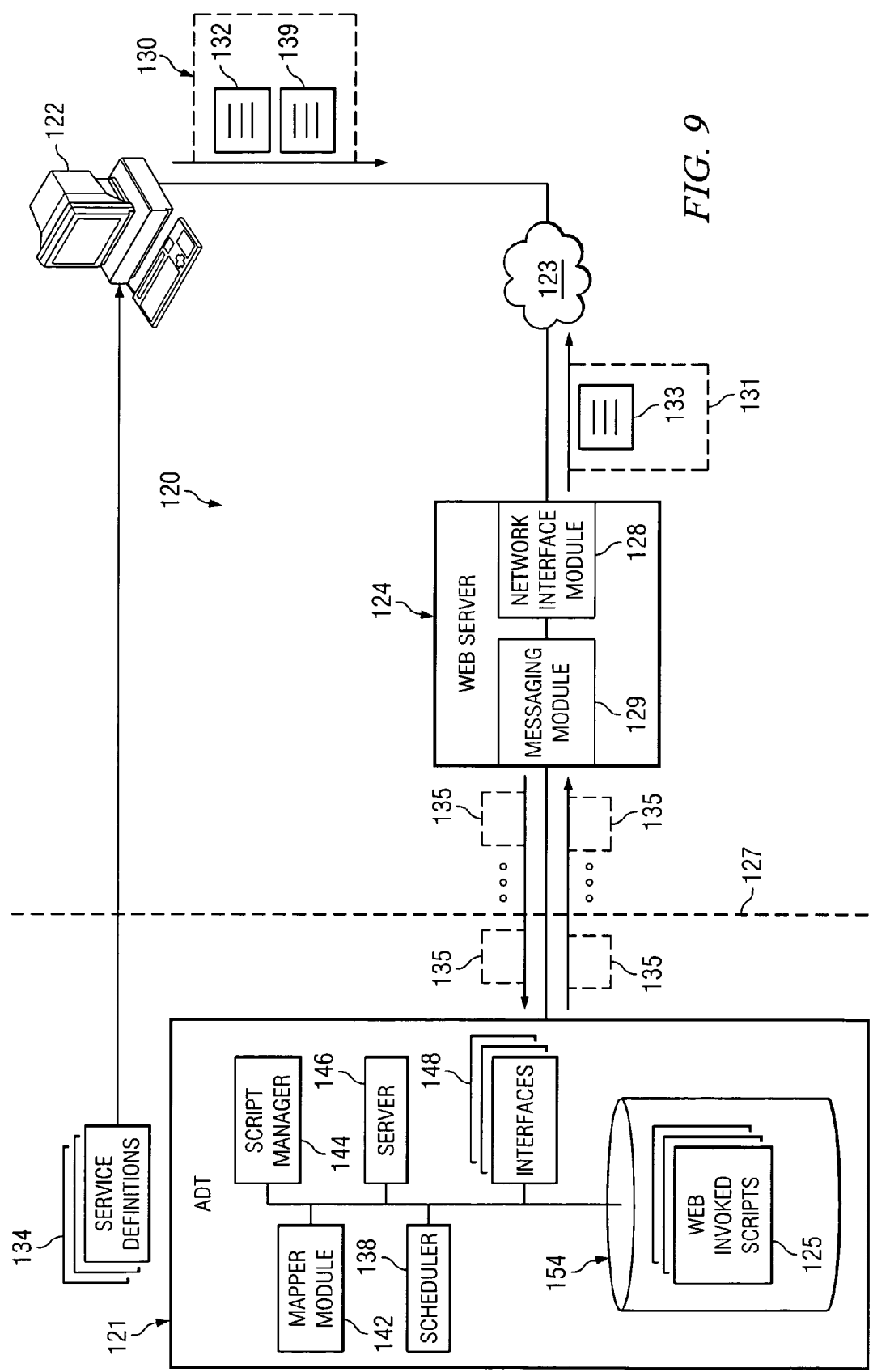
FIG. 9 shows a particular embodiment of a data transformation system capable of providing data transformation functionality to remote clients as a web service.
Figure 10:
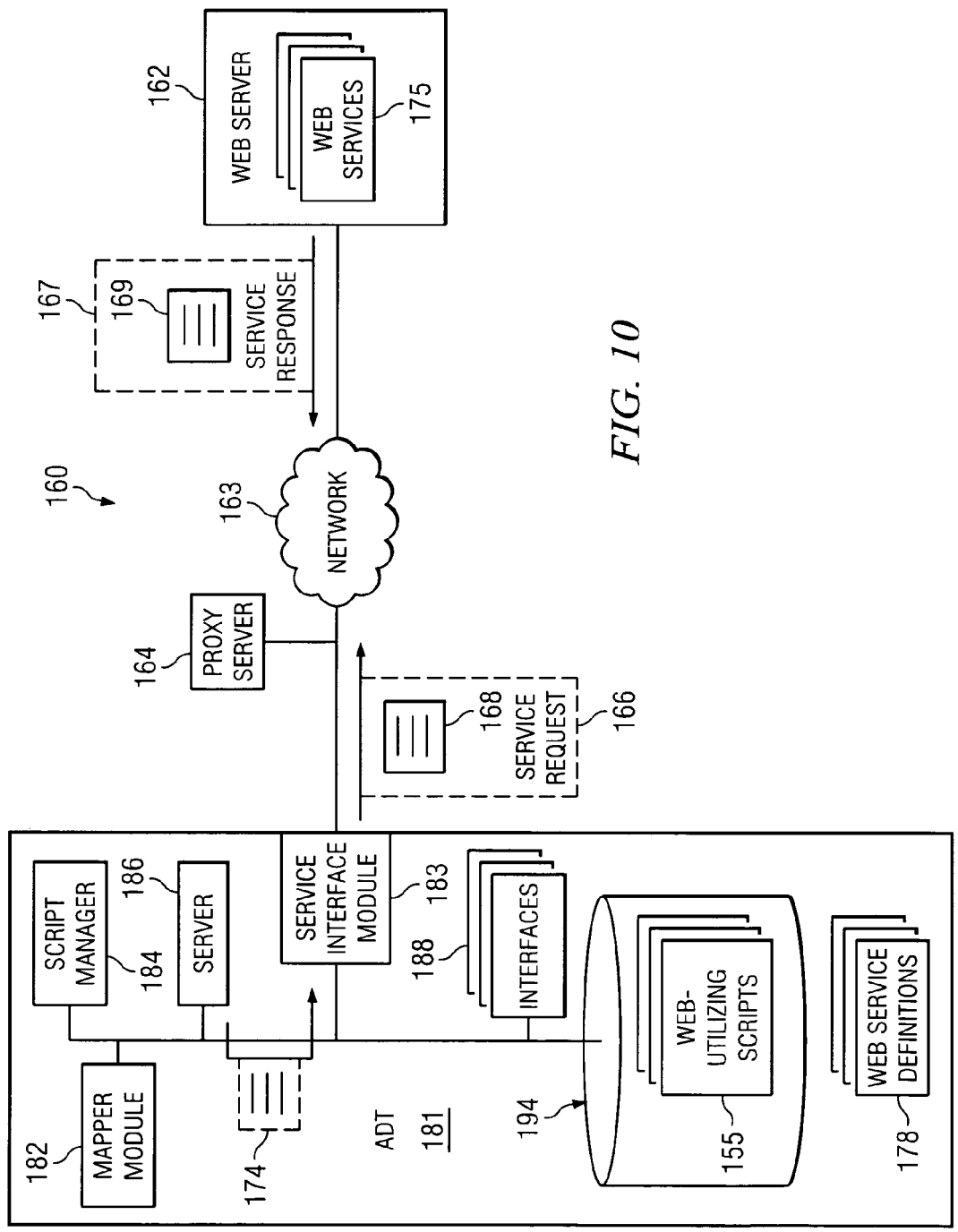
FIG. 10 show a particular embodiment of a data transformation system capable of utilizing web services offered by remote web servers as part of data transformation functionality supported by the system.
Figure 11:
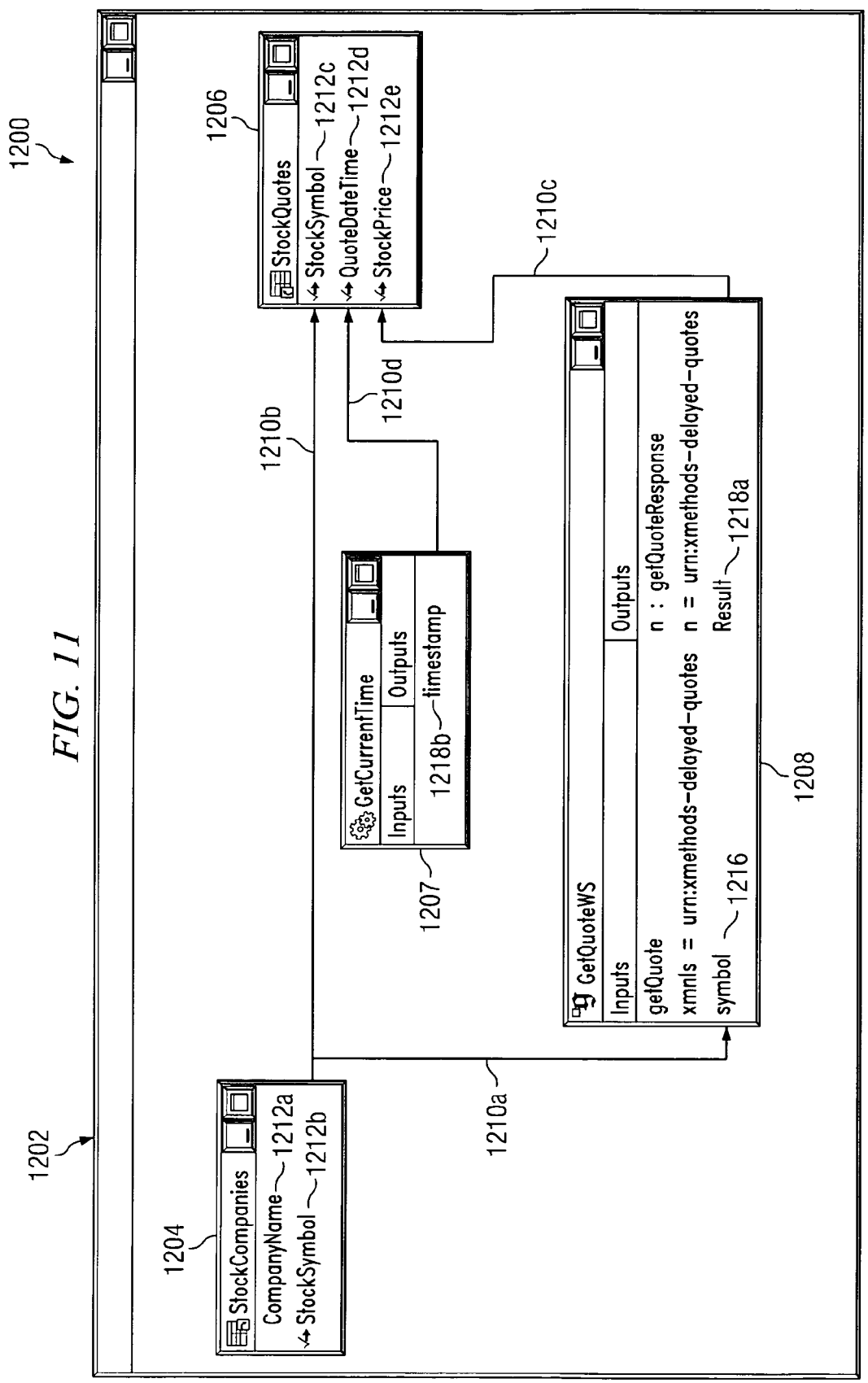
FIG. 11 is an example screen shot illustrating some functionality of an example Mapping module that may be utilized by particular embodiments of the system shown in FIG. 10.

FIGS. 9-12 illustrate the operation of particular embodiments of data transformation systems that may utilize web services in various ways to supplement the transformation functionality described above with respect FIGS. 1-8. FIG. 9 illustrates the operation of a system 120 capable of generating data transformation scripts that are similar to those described above but that may be executed as web services. Meanwhile, FIGS. 10-12 illustrate the operation of a system 160 capable of generating data transformation scripts that are also similar to those described above but that may invoke web services offered by other servers to complete requested data transformations. The incorporation of web service features into ADT systems such as these may increase the flexibility of these ADT systems and may further reduce the amount of design required of ADT users.

FIG. 9 illustrates a system 120 that allows transformation scripts (referred to herein as "web-invoked scripts 125") to be executed via a web service call. In general, the ability to execute such web-invoked scripts 125 as a web service may allow the existing program execution architecture of system 100 to be accessed by remote devices through a call handled by a web server 124 with execution-specific data passed in and out. Additionally such a configuration may allow system 120 to schedule the execution of a web-invoked script 125 for a future time and/or add other forms of flexibility to the transformation functionality described above. As shown in FIG. 9, system 120 includes ADT 121, web server 124, client 122, and network 123. Moreover, web server 124 includes network interface module 128 and messaging module 129, while ADT 121 includes mapper module 142, script manager 144, server 146, interfaces 148, and internal database 154. Except as explicitly noted below, mapper module 142, script manager 144, server 146, interfaces 148, and internal database 154 may, in particular embodiments, all operate in a similar fashion to that described above with respect to similarly-labeled components of ADT 101. In addition, ADT 121 includes scheduler 138.

In general, web server 124 receives service requests 130 from one or more clients 122 requesting data transformation service. Web server 124, in turn, requests these data transformation services from server 146. After server 146 completes the desired data transformation using web-invoked scripts 125, web server 124 may also transmit a service response 131 to client 122 with the results of the requested data transformation services. Web server 124 may represent any appropriate combination of software and/or hardware suitable to provide the described functionality. For example, in particular embodiments, web server 124 may represent a server running Apache Tomcat. Additionally, in particular embodiments, web server 124 may represent the same physical component as ADT 121. For example, ADT 121 and web server 124 may represent applications running on the same computer. Alternatively, as suggested by dotted line 127 between ADT 121 and web server 124, in particular embodiments, ADT 121 and web server 124 may represent separate physical devices, or applications running on separate physical devices, operable to communicate with one another.

Client 122 may represent a software application executing on a suitably configured personal computer (PC), networked terminal, or any other appropriate device capable of accessing web services. Although the description below focuses on embodiment of system 120 in which client 122 is running on a separate physical device remote from ADT 121, in particular embodiments, client 122 may represent a software application running on the same computer as ADT 121 and/or web server 124. Network 123 may represent a local area network (LAN), portions of the Internet, or any other suitable public or private communications network. Web server 124, server 146, network interface module 128, and messaging module 129 represent any appropriate combination of hardware and/or software suitable to provide the described functionality.

In operation, ADT 121 generates web-invoked scripts 125 to perform user-defined data transformations. A user of system 120 may define the relevant transformations and ADT 121 may generate the corresponding web-invoked scripts 125 in any appropriate manner. In particular embodiments, a GUI similar to the one described in FIGS. 3A-3C and 4A-4B, may be modified for used in creating web-invoked scripts 125. For example, the GUI of FIG. 4 may be modified to include a "Web Services" select box that the user may select, when creating a script using the process described above with respect to FIG. 4, to indicate that the transformation currently being defined is intended to be provided as a web service. When the user selects the box to indicate that this script is to be executed as a web service, the GUI may enable a number of GUI inputs for defining web-invoked scripts 125. As a result, in particular embodiments, server 146 may receive information identifying web-service-capable transformation web-invoked scripts 125 in a similar fashion to that described above with respect to scripts 115.

Furthermore, web-invoked scripts 125 may also be similar in structure to scripts 115 described above with respect to FIGS. 5A-5C with suitable modifications made to the code to allow web-invoked scripts 125 to utilize data from web service messages as the target and source files of the relevant data transformation. For example, in particular embodiments, the LOAD and STORE functions for the XML interface described above accept a "#ws_xml" field that indicates whether the target or source file, respectively, should be retrieved from a web service request or transmitted as a web service response. For web-invoked scripts 125 this field is set true when the web-invoked script 125 is generated.

ADT 121 may be configured to generate web-invoked scripts 125 that accept input data from client 122 and/or provide output data to client 122. In particular embodiments, a particular web-invoked script 125 may be configured not to accept input data from client 122 and/or not provide output data to client 122, depending on the configuration of ADT 121 and the transformation defined for the relevant web-invoked script 125. In such embodiments, web-invoked scripts 125 may be configured to retrieve input data from local memory and/or to store output data to local memory as an alternative to exchanging data with client 122.

Additionally, once a particular web-invoked script 125 has been generated, system 120 may be configured to create a service definition 134 that can be used to provide client 122 with information regarding the appropriate manner for communicating with web server 124 to request the associated transformation as a web service. Service definition 134 may represent a Web Services Description Language (WSDL) file, and XML schema, and/or any other appropriate collection of information identifying for client 122 the appropriate inputs to use and/or outputs to anticipate when requesting the execution of the relevant web-invoked script 125 as a web service. In particular embodiments, service definition 134 may be generated by mapper module 142 when a particular data transformation is defined and a user requests the associated script be made available as a web service. In particular embodiments, when the user chooses to have service definition 134 generated, mapper module 142 may generate this service definition 134 "automatically" in the sense that mapper module 142 may generate service definition 134 based on mappings in the program palette without any additional input from the user beyond the initial request for generation of service definition 134. Server 146, web server 124, or any other appropriate component of system 120 may then publish service definition 134 at an appropriate registry (e.g., in a Universal Description, Discovery, and Integration (UDDI) repository) for access by clients 122 in system 120, transmit service definition 134 to requesting clients 122, or otherwise make service definition 134 available to clients 122.

After one or more web-invoked scripts 125 have been generated, client 122 may request data transformation services by transmitting a service request 130 to web server 124 over network 123. Service request 130 may represent a Simple Object Access Protocol ("SOAP") message, an Electronic Business using eXtensible Markup Language ("ebXML") message, or a message of any other type or format appropriate for requesting web services. Service request 130 may include request data 132, such as one or more XML data components; one or more DBMS table entries, rows, or columns; or any other appropriate collection of data. In particular embodiments, web server 124 may also be configured to support scheduled processing of service requests 130, and service request 130 may also specify that the request is for a scheduled execution and supply a requested execution time 139.

A network interface module 128 of web server 124 receives service request 130 and processes service request 130 to facilitate execution of the request by ADT 121. Network interface module 128 may represent any appropriate hardware and/or software suitable to provide the described functionality. In particular embodiments, network interface module 128 comprises a Java servlet that handles initial message decoding and a Java Native Interface (JNI) for communicating with messaging module 129.

Network interface module 128 performs any appropriate decoding of service request 130 and extracts request data 132. For example, as noted above, in particular embodiments, service request 130 represents a SOAP message, and network interface module 128 performs initial SOAP decoding of service request 130 and extracts request data 132 from the service request 130. Network interface module 128 then passes request data 132 and any other appropriate information from the service request 130, such as the requested execution time 139, to a messaging module 129 of web server 124. In particular embodiments, a Java servlet of network interface module 128 passes the request data 132 to messaging module 129 using JNI.

Messaging module 129 receives request data 132 from network interface module 128 and interacts with server 146 to facilitate completion of the requested data transformation. In particular embodiments, messaging module 129 may interact with server 146 using threaded messages 135. For example, in particular embodiments, web server 124 and server 146 may be operating in a system using Computer Associate's Platinum Enterprise Communicator (PEC), and threaded messages 135 may represent PEC messages transmitted between messaging module 129 and server 146. Additionally, threaded messages 135 may each include a thread identifier and/or a source identifier to allow both web server 124 and server 146 to coordinate communication and processing related to service request 130.

Thus, after receiving the decoded service request 130, messaging module 129 transmits one or more threaded messages 135 to server 146 to request transformation services. As part of one or more of the threaded messages 135, messaging module 129 communicates the request data 132 to server 146. In particular embodiments, server 146 may be able to identify, based on the name and/or structure of request data 132, an appropriate web-invoked script 125 to execute from among a plurality of web-invoked scripts 125 currently stored in internal database 154. Alternatively, messaging module 129 may also communicate additional information to server 146 to allow server 146 to determine the appropriate data transformation to be completed. For example, in particular embodiments, messaging module 129 may also include the name of a particular web-invoked script 125 to be executed by server 146 in completing the desired data transformation.

Server 146 receives threaded messages 135 from web server 124 and initiates one of web-invoked scripts 125 using request data 132 as the source file. As noted above, in particular embodiments, web-invoked scripts 125 may be generated with LOAD statements that are configured to receive input data from service requests 130 and/or with STORE statements that are configured to write output data to service responses 131. Once server 146 has completed execution of the appropriate web-invoked script 125, server 146 may communicate back any appropriate output, including any response data 133 generated as a result of the execution of the relevant web-invoked script 125, to the messaging module 129 of web server 124 in one or more threaded messages 135. Alternatively, server 146 may store any output of the executed web-invoked script 125 locally and may not communicate any response data 133 back to web server 124. In particular embodiments, response data 133 for all scheduled data transformations may be stored local to ADT 121, and clients 122 may not receive any response data 133 when requesting scheduled data transformation services.

Messaging module 129 receives threaded messages 135 from server 146 and forwards threaded message 135 (or information obtained from the threaded message 135) to network interface module 128. Network interface module 128 then determines an appropriate client 122 to which a service response 131 should be transmitted. Network interface module 128 generates a service response 131 and transmits service response 131 to the client 122 that originally transmitted the corresponding service request 130. Service response 131 includes the response data 133 received from server 146. As a result of this process, a remote user using client 122 may be able to remotely access and utilize the data transformation capabilities of ADT servers using web service calls.

Additionally, as suggested above, particular embodiments of web server 124 and server 146 may support scheduled execution of the data transformations requested via web service calls. More specifically, web server 124 may receive service requests 130 that include an execution time 139. Server 146 may then execute the web-invoked script 125 corresponding to the requested transformation at a time determined based on execution time 139. For example, particular embodiments of server 146 may include a scheduler 138. Messaging module 129 may determine, based on the inclusion of execution time 139 in particular service requests 130, that those requests are to be scheduled for execution at a later time. For these service requests 130, messaging module 129 may transmit, to scheduler 138, threaded messages 135 that include the request data 132 and execution time 139. Scheduler 138 may then store request data 132, execution time 139, and any other appropriate information to allow server 146 to properly execute the desired transformation. At an appropriate time, scheduler 138 may then initiate the desired web-invoked script 125 or instruct other components of server 146 to initiate the desired web-invoked script 125. If the service request 130 included a request data 132, scheduler 138 may provide this to the relevant components as well.

Additionally, scheduler 138 may determine the appropriate time to begin execution of the relevant script based in any suitable manner on execution time 139. For example, execution time 139 may represent an initiation time at which scheduler 138 will execute the web-invoked script 125, a completion time at which the web-invoked script 125 must be completed, or a priority level that server 146 will use to order the various tasks server 146 currently has scheduled.

Thus, system 120 provides a flexible solution for data transformation solutions. As a result, system 120 may be capable of providing a variety of services to remote users using standardized interfaces. Moreover, system 120 may be configured to provide clients 122 information as to the services offered by server 146 and the proper manner for accessing those services through the use of a service definition 134. Additionally, system 120 may be capable of timing the execution of the relevant data transformation based on the desires of the requesting user. As a result, system 120 may provide a number of operational benefits.

FIG. 10 illustrates a system 160 that utilizes web services to provide functionality for transformation programs (referred to herein as "web-utilizing scripts 155"). In general, system 160 allows a user to identify a web service to be called to provide all or a portion of a particular data transformation. In particular embodiments, web-utilizing scripts 155 may be identical to particular types of scripts 115 described above with respect to FIGS. 1-8 with the added ability to invoke external web services based on a defined data transformation. The web service is identified during mapping and a particular web-utilizing script 155 is generated to perform the defined data transformation using the specified web service.

In the illustrated embodiment, system 160 includes an ADT 181, a web server 162, a network 163, and a proxy server 164. ADT 181 includes server mapper module 182, script manager 184, server 186, interfaces 188, and internal database 194. Except as explicitly noted below, mapper module 182, script manager 184, server 186, interfaces 188, and internal database 194 may, in particular embodiments, all operate in a similar fashion to that described above with respect to similarly-labeled components of ADT 101. In addition, ADT 181 includes service interface module 183.

Service interface module 183 is responsible for receiving input parameters from server 186 during execution of a web-utilizing script 155, packaging input parameters, invoking the web service, and un-packaging output parameters. Although the description below focuses on examples in which ADT 181 transmits input data to the requested web service and receives particular output data back from the web service, particular web services may be configured to receive no input data and/or to transmit no output data back to ADT 181. In particular embodiments, service interface module 183 includes a dynamically-linked C++ library capable of receiving appropriate input data (as described further below), structuring the input data in an appropriate manner for the particular web service to be invoked, and communicating the data to a SOAP tool, which in turn transmits a SOAP message containing the data to the designated web server 162. In particular, the dynamically-linked library may support a generic web execution function capable of calling any web service identified by function parameters 174 received by the generic web execution function. In general, however service interface module 183 may represent any suitable hardware and/or software appropriate to communicate with web servers and utilize web services.

Web server 162 may represent any appropriate component providing any functionality (generically referred to herein as "web services 175") that can be utilized through the transmission of a suitably-structured request and the receipt of a corresponding response. For example, in particular embodiments, web server 162 may comprise an Apache Axis or Microsoft .NET server supporting web services 175. In general, however, web server 162 may represent any appropriate combination of software and/or hardware suitable to provide the described functionality.

In operation, mapper module 182 receives information defining a data transformation that utilizes a web service 175 and generates a web-utilizing script 155 that invokes the relevant web service 175 to execute the defined transformation. Web-utilizing scripts 165 may be similar in content and operation to scripts 115 described above with respect to FIGS. 1-8, but with the addition of web service calls to, in part, transform data extracted from source data files into data to be written into target data files. An example of a particular web-utilizing script 165 is shown in FIG. 12 and discussed below.

More specifically, mapper module 182 allows a user to design a transformation program to transform data via mappings from one or more source files to one or more target files utilizing one or more specified web services. In particular embodiments, the mapping may be defined via a GUI having a program palette (as shown in FIG. 11) in which a user is allowed to select a source object definition, a target object definition, and a web service definition 178. In particular embodiments, web service definition 178 may comprise information defining inputs expected by and outputs transmitted by the corresponding web service 175. The user may then drag and drop data components from a graphical representation of the source object definition into a graphical representation of the web service definition 178, and then drag and drop outputs of web service definition 178 into a graphical representation of the target object definition in order to define the desired transformation.

As part of the information the user provides the define the transformation, the user may identify a source object definition, a target object definition, and a web service definition 178 that will be utilized as part of the transformation. With respect to the web service, the user may identify such information as the web service Uniform Resource Indicator (URI) location, the method to invoke for the web service, a proxy server to contact, and/or any other appropriate information to facilitate communication between the web-utilizing script 155 and the relevant web service 175.

The user may also provide a web service definition 178 to be displayed in a GUI associated with ADT 181. Web service definition 178 defines the inputs and outputs associated with a particular web service 175 and any additional information service interface module 183 may need to request web services from a particular web server 162. The user may provide web service definition 178 to ADT 181 in any suitable manner. In particular embodiments, ADT 181 may be capable of parsing a WDSL, XML schema, or other suitable description of a web service to automatically generate web service definition 178. In alternative embodiments, the user may provide web service definition 178 to ADT 181 manually, identify a previously-saved web service definition 178, or provide web service definition 178 to ADT 181 in any appropriate manner.

After the user has provided one or more source object definitions, one or more target object definitions, and one or more web service definitions 178, the user specifies mappings between source file components and target file components, between source file components and web service inputs, and/or between web service outputs and target file components. Once the user has provided the appropriate information to define the transformation, mapper module 182 generates a web-utilizing script 155 to perform the defined data transformation. This web-utilizing script 155 will include calls to the identified web service 175 through service interface module 183.

Web-utilizing scripts 155 may be stored by mapper module 182 until a user requests the corresponding data transformation be executed. When a particular web-utilizing script 155 is executed, server 186 will execute that web-utilizing script 155 and as part of this process will perform data transformations that utilize web services. More specifically, in particular embodiments, web-utilizing script 155 will include a call to service interface module 183 that will transfer various function parameters 174 to service interface module 183 for use in generating a service request 166. The exact data that is included in function parameters 174 may depend on the configuration of server 186, web server 162, and/or service interface module 183. In particular embodiments, function parameters 174 includes the URI for the relevant web service, the method to be invoked by that web service, any input data 168, and/or empty output data structures to be filled with the results of the web service. Input data 168 may represent data of any appropriate format including, but not limited to, one or more XML data components, one or more database rows, or any portion of a flat file. Similarly, the output data structures may represent empty XML data components, empty rows, empty variables, or any other suitable structure for holding data. Particular data transformations may not require input data or return output data, and the web service calls executed by web-utilizing scripts 155 may be tailored to reflect this fact.

After receiving function parameters 174 from server 186, service interface module 183 invokes the designated web service 175. In particular embodiments, this process includes connecting to the URI specified in the function parameters 174, transferring the input data 168 into a service request 166, and transmitting service request 166 to a particular web server 162 associated with the specified URI. In particular embodiments, service request 166 represents a SOAP message that contains input data 168. Alternative embodiments may use other appropriate communication protocols to request web services and otherwise interact with web server 162.

Web server 162 receives service request 166 and unpacks data included in service request 166. Web server 162 identifies the appropriate method to invoke based on information in the received service request 166 and invokes the identified method with respect to input data 168, if any, that is included in service request 166. After the method has been invoked, web server 162 transmits output data 169, if any, back to service interface module 183 as part of a service response 167.

Service interface module 183 receives service response 167 and completes the data transformation requested by the user. In particular, service interface module 183 receives service response 167, performs any appropriate unpacking of service response 167, and transfers output data 169, if any, into the empty data structures passed to service interface module 183. Service interface module 183 then transmits the output data 169 back to server 186 for use in completing execution of web-utilizing script 155. In particular embodiments, service interface module 183 transmits the output data 169 to server 186 as the return value of the generic web execution function originally called by service interface module 183.

In addition, particular embodiments of service interface module 183 may support the use of proxy servers 164 (e.g., for use with firewalls) to communicate with web server 162. More specifically, in particular embodiments of system 160, function parameters 174 passed to service interface module 183 may include information that allows service interface module 183 to identify a proxy server 164 to use when invoking a particular web service. This information may include a proxy server host name, an appropriate port number to use when communicating with the designated proxy server 164, a user identifier recognized by the designate proxy server 164, a password associated with the designated proxy server 164, and/or any other suitable information to facilitate communication between server 186 and proxy server 164. Alternatively, some or all of this type of information may be stored in a proxy profile, and function parameters 174 may identify the appropriate profile to use when invoking the relevant web service. Server 186 may then direct any communication with web server 162 through proxy server 164. This may allow users to utilize publicly-available web services 175 for data transformations without compromising the security of their own systems.

Thus, system 160 provides additional flexibility and user ease with respect to the execution of data transformations. By allowing a user to access and utilize available web services, system 160 may further reduce the amount of programming and/or design the user must complete. Automated parsing of web service definitions may improve ease-of-use even further in some embodiments. Additionally, particular embodiments may be configured to interact with web service through a proxy server, thereby making web-service functionality available for data transformations without compromising security.

FIG. 11 illustrates an example screen shot 1200 illustrating functionality of a GUI that may be used, in particular embodiments of system 160, to define a data transformation that utilizes one or more web services. In particular, FIG. 11 illustrates a program palette 1202 that allows a user to design a desired data transformation from one or more source files to one or more target files using one or more web services. The illustrated embodiment includes a graphical representation of a source object definition 1204, a target object definition 1206, a reusable transformation 1207, and a web service definition 1208. Although FIG. 11 and the description below focus, for purposes of illustration, on a particular type of GUI that allows a user to enter certain information in a specific manner, system 160 may utilize any appropriate form of GUI to facilitate interaction with a user. Moreover, particular embodiments of system 160 may include no GUI and users may enter information manually, instruct system 160 to retrieve saved information, and/or provide information to system 160 in any other suitable manner. Furthermore, FIG. 11 illustrates, for purposes of example, a scenario in which a web service is utilized to transform portions of a source database table into a target database table. Nonetheless, the described techniques may be utilized with target and source files of any appropriate format including XML files and flat files.

With respect to the particular GUI illustrated in FIG. 11, a user may begin entering information by dragging and dropping of object definitions 1204 and 1206, reusable data transformation 1207, and web service definition 1208 into program palette 1202. For example, in the illustrated example, a user has dragged a source object definition 1204 named "StockCompanies" and a target object definition 1206 named "StockQuotes" into program palette 1202. Additionally, the user has dragged a web service definition 1208 named "GetQuoteWS" and a reusable data transformation 1207 named "GetCurrentTime" into program palette 1202. The "GetQuoteWS" web service definition 1208 in the illustrated example is associated with a web service 175 that provides stock prices for specified stock symbols. In addition, particular embodiments of ADT 181 may support scripted, reusable functionality, such as one or more reusable data transformations 1207, that provide data transformations and/or custom outputs that may be used to execute frequently-used data transformations or to generate frequently-used data outputs. Here reusable data transformation 1207 provides the current time as output 1218b.

Once the appropriate object definitions 1204 and 1206, any reusable transformations 1207, and any web service definitions 1208 have been introduced to program palette 1202, the user may define connections 1210 between specific data components 1212 of source object definitions 1204 and target object definitions 1206 and particular inputs 1216 and outputs 1218 of web service 175. In particular embodiments, the user may do this by dragging and dropping components of source object definition 1204 onto inputs 1216 of web service definition 1208 or reusable data transformation 1207 or onto components of target object definition 1206, and by dragging and dropping outputs 1218 of web service definition 1208 or reusable data transformation 1207 onto components of target object definition 1206.

For example, in the illustrated scenario, the user has dragged the "Stock Symbol" data component 1212b from the "StockCompanies" source object definition 1204 to the "symbol" input 1216 of "GetQuoteWS" web service definition 1208 forming connection 1210a. The user has also dragged the "Stock Symbol" data component 1212b from the "StockCompanies" source object definition 1204 to the "StockSymbol" data component 1212c of the "StockQuotes" target object definition 1206 forming connection 1210b. Additionally, the user has dragged the "Result" output 1218a of the "GetQuoteWS" web service definition 1208 to the "StockPrice" data component 1212e of the "StockQuotes" target object definition 1206 forming connection 1210c. The user also has dragged the "timestamp" output 1218b of the "GetCurrentTime" reusable transformation 1207 to the "QuoteDateTime" data component 1212d of the "StockQuotes" target object definition 1206 to create connection 1210d.

After moving the relevant object definitions 1204 and 1206, web service definitions 1208, and reusable data transformations 1207 to program palette 1202 and creating the appropriate connections 1210, the user may then utilize system 160 to generate a web-utilizing script 155 to implement the defined transformation. In particular embodiments, the GUI for defining the transformation may additionally include a "Generate Script" button or other input the user can use to request a web-utilizing script 155 be generated from the mappings the user has created on program palette 1202. Alternative embodiments may use any appropriate mechanism for the user to request script generation.

FIGS. 12A and 12B collectively illustrate an example of a web-utilizing script 155 that may be generated by a particular embodiment of system 160 based on the transformation defined in FIG. 11. Although FIGS. 12A and 12B illustrate one example of a particular web-utilizing script 155 that may be generated to implement the transformation defined in FIG. 11, alternative embodiments of system 160 may generate other types of web-utilizing scripts 155 to implement the illustrated transformation based on the configuration and capabilities of system 160. For purposes of description, the web-utilizing script 155 is broken into multiple sections 1310.

Section 1310a identifies a code fragment that defines various variables and structures to be used during execution of web-utilizing script 155. Section 1310b generates the array that will be used to pass XML data from server 186 to service interface module 183 as part of function parameters 174. This array will store any input data that will be transmitted by service interface module 183 to the appropriate web service 175. ser. Section 1310c constructs the data structure that will be used to pass information about the relevant web service to service interface module 183 as another part of function parameters 174. Section 1310d constructs the empty data structure that will be filled with output data 169 and passed to service interface module 183 as yet another part of function parameters 174. Section 1310e sets the input values that will be sent to service interface module 183 as part of function parameters 174. In the illustrated example, section 1310e is defined by connection 1210a in the associated mapping shown in FIG. 11. Section 1310f calls service interface module 183 using function parameters 174. Section 1310g verifies that the call to service interface module 183 was successful. Section 1310h processes output data 169 received back from service interface module 183. In the illustrated example, section 1310h is defined by connection 1210c in the associated mapping shown in FIG. 11.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for moving data from a source file to a target file, comprising:
   creating an array based, at least in part, on a first data definition of a target file;
   initializing a value in each array element of the array;
   storing data in the array from at least a portion of one or more data components in a source file having a second data definition, based on a mapping between the source file data components having the second data definition and one or more target file data components having the first data definition, by:
      determining whether an array element corresponding to each source file data component is included in the array;
      in response to determining that an array element corresponding to a particular data component is included in the array, setting a value of the corresponding array element based, at least in part, on data in that data component; and
      in response to determining that an array element corresponding to a particular data component is not included in the array, discarding that data component; and
   writing at least a portion of the data stored in the array to one or more target files.

2. The method of claim 1, wherein determining whether an array element corresponding to each data component is included in the array comprises:
   parsing the source file;
   while parsing the source file, detecting the beginning of a data component; and
   in response to detecting the beginning of a data component, determining whether an array element corresponding to the detected data component is included in the array.

3. The method of claim 1, wherein storing data in the array comprises:
   parsing the source file until detecting a start of a data component matching a name of the data definition, the name corresponding to a root element described in the structure; and
   after detecting the start of the root element, storing data in the array from at least a portion of the data components in the source file.

4. The method of claim 1, wherein determining whether an array element corresponding to the particular data component is included in the array comprises comparing a name associated with the data component to a name value associated with one or more array elements in the array element until determining that the name associated with the data component matches the name value of a particular array element.

5. The method of claim 1, wherein the source file comprises a hierarchical file.

6. The method of claim 5, wherein the hierarchical file comprises an XML file.

7. The method of claim 1, wherein the target file comprises a flat file.

8. The method of claim 1, wherein the target file comprises relational data.

9. The method of claim 8, wherein the relational data comprises at least a portion of a relational database.

10. The method of claim 1, wherein each of the data components comprises one of an XML element and an XML attribute.

11. The method of claim 1, wherein the target file comprises one of a database table and a flat file.

12. The method of claim 1, wherein storing data in the array comprises:
    determining whether a detected data component is of a repeating component type;
    in response to determining that the detected data component is not of a repeating component type, storing at least a portion of the data from the detected data component in a corresponding array element; and
    in response to determining that the detected data component is of a repeating component type, storing at least a portion of the data from the detected data component in a memory location and storing a pointer identifying the memory location in the corresponding array element.

13. The method of claim 1, wherein storing data in the array comprises:
    determining whether a detected data component is of a repeating component type;
    in response to determining that the detected data component is not of a repeating component type, storing at least a portion of the data from the detected data component in a corresponding array element; and
    in response to determining that the detected data component is of a repeating component type:
       determining whether any child component of the detected data component is of a repeating component type;
       in response to determining that no child component of the detected data component is of a repeating component type, storing in a memory location at least a portion of the data in any child components of the detected data component and storing a pointer identifying the memory location in the corresponding array element; and
       in response to determining that a child component of the detected data component is of a repeating component type:
          storing at least a portion of the data from the repeating child data component in a first memory location;
          storing at least a portion of the data from the detected data component and a pointer identifying the first memory location in a second memory location; and
          storing a pointer identifying the second memory location in the corresponding array element.

14. The method of claim 1, wherein creating an array based, at least in part, on the first data definition of the source file comprises:
    receiving a data definition of a source file comprising an XML record definition and an XML component definition for a repeating child component associated with the XML record definition;
    displaying the XML record definition in a first portion of a graphical user interface (GUI);
    displaying the XML component definition for the repeating child component in a second portion of the graphical user interface; and
    creating an array based, at least in part, on the data definition of the source file.

15. The method of claim 14, wherein creating an array based, at least in part, on the first data definition of the source file comprises:
    identifying a first set of data components, the first set including one or more children components of the XML record definition for which a user has created mappings in the first portion of the GUI;
    identifying a second set of data components, the second set including one or more children components of the repeating child component for which the user has created mappings in the second portion of the GUI; and generating an array element in the array for each of the identified data components.

16. The method of claim 15, wherein storing data in the array from at least a portion of the data components in the source file comprises:

storing data from data components in the first set of data components in corresponding array elements; and after storing data from data components in the first set of data component, storing data from data components in the second set of data components in a memory location and storing a pointer to the memory location in a corresponding array element.

* * * * *